United States Patent
Balasubramanian et al.

(10) Patent No.: US 12,407,457 B2
(45) Date of Patent: Sep. 2, 2025

(54) CARRIER AGGREGATION FOR WIRELESS TRANSMIT/RECEIVE UNIT

(71) Applicant: INTERDIGITAL PATENT HOLDINGS, INC., Wilmington, DE (US)

(72) Inventors: Anantharaman Balasubramanian, San Diego, CA (US); Nagi Mahalingam, San Diego, CA (US); Ravikumar V. Pragada, Warrington, PA (US); Benoit Pelletier, Roxboro (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 637 days.

(21) Appl. No.: 17/266,298

(22) PCT Filed: Aug. 7, 2019

(86) PCT No.: PCT/US2019/045475
§ 371 (c)(1),
(2) Date: Feb. 5, 2021

(87) PCT Pub. No.: WO2020/033526
PCT Pub. Date: Feb. 13, 2020

(65) Prior Publication Data
US 2021/0314112 A1 Oct. 7, 2021

Related U.S. Application Data

(60) Provisional application No. 62/716,706, filed on Aug. 9, 2018.

(51) Int. Cl.
*H04L 5/00* (2006.01)
*H04W 72/0453* (2023.01)
(Continued)

(52) U.S. Cl.
CPC .......... *H04L 5/0044* (2013.01); *H04L 5/001* (2013.01); *H04L 5/0053* (2013.01);
(Continued)

(58) Field of Classification Search
CPC ... H04L 5/0044; H04L 5/0053; H04L 5/0076; H04L 5/001; H04W 72/0453; H04W 72/40; H04W 72/542
See application file for complete search history.

(56) References Cited

U.S. PATENT DOCUMENTS 11,051,304 B2 * 6/2021 Lee .................. H04W 72/0453
2013/0163543 A1 6/2013 Freda et al.
(Continued)

FOREIGN PATENT DOCUMENTS

CN 103024796 A 4/2013
CN 106664634 A 5/2017
(Continued)

OTHER PUBLICATIONS

English translation of WO 2018/174671 A1, 2018, Retrieved from PE2E Search on Aug. 4, 2023 (Year: 2018).*
(Continued)

*Primary Examiner* — Omar J Ghowrwal
(74) *Attorney, Agent, or Firm* — Mark D. Pratt

(57) ABSTRACT

Wireless transmit/receive units (WTRUs) may include unmanned aerial vehicles (UAVs). The WTRUs/UAVs may cooperate to exchange channel busy ratio (CBR) and/or CBR statistics of one or more (e.g., all) the carriers that the WTRUs/UAVs monitors with each other for carrier selection/carrier reselection. A network may provide one or more inputs on carrier selection. For example, a network may provide one or more inputs on carrier selection based on the congestion that the network infers (e.g., through the CBR measurements reported by the WTRUs/UAVs and/or
(Continued)

through its own measurements). MAC/PHY layers may be configured to perform transmit adaptation during PDCP packet duplication. For example, the carrier aggregation capability of receivers may be considered to adapt the number of transmissions per carrier. Based on the carrier aggregation capability of the receivers, the number of transmissions at one or more (e.g., every) carriers may be optimized jointly across carriers.

15 Claims, 23 Drawing Sheets

(51) Int. Cl.
*H04W 72/40* (2023.01)
*H04W 72/542* (2023.01)

(52) U.S. Cl.
CPC ....... *H04L 5/0076* (2013.01); *H04W 72/0453* (2013.01); *H04W 72/40* (2023.01); *H04W 72/542* (2023.01)

(56) References Cited

U.S. PATENT DOCUMENTS

| | | | |
|---|---|---|---|
| 2018/0124771 | A1 | 5/2018 | Mok et al. |
| 2019/0090250 | A1* | 3/2019 | Lee .................. H04W 72/02 |
| 2019/0104525 | A1* | 4/2019 | Santhanam .......... H04L 1/1825 |
| 2020/0107330 | A1 | 4/2020 | Chae et al. |
| 2021/0006954 | A1 | 1/2021 | Xu et al. |
| 2021/0176751 | A1* | 6/2021 | Belleschi .......... H04W 72/0453 |

FOREIGN PATENT DOCUMENTS

| | | | |
|---|---|---|---|
| CN | 106900005 A | 6/2017 | |
| CN | 108260163 27 | 7/2018 | |
| CN | 108260163 A | 7/2018 | |
| WO | 2015/172098 A1 | 11/2015 | |
| WO | 2016/008730 A1 | 1/2016 | |
| WO | 2018027528 A1 | 2/2018 | |
| WO | WO-2018153451 A1 * | 8/2018 | ........... H04L 5/0037 |
| WO | WO-2018174671 A1 * | 9/2018 | ......... H04L 41/0803 |

OTHER PUBLICATIONS

Autolitano et al., "Understanding the Channel Busy Ratio Metrics for Decentralized Congestion Control in VANETs", 2014 International Conference on Connected Vehicles and Expo (ICCVE), Nov. 3, 2014, pp. 717-722.
Google Inc., "Google UAS Airspace System Overview", 2015, 5 pages.
Molina-Masegosa et al., "LTE-V for Sidelink 5G V2X Vehicular Communications: A New 5G Technology for Short-Range Vehicle-to-Everything Communications", IEEE Vehicular Technology Magazine, vol. 12, No. 4, Dec. 2017, pp. 30-39.
3rd Generation Partnership Project (3GPP), R2-168593, "Congestion Control for V2V", Qualcomm Incorporated, 3GPP TSG-RAN WG2 Meeting #96, Reno, USA, Nov. 14-18, 2016, 13 pages.
3rd Generation Partnership Project (3GPP), R2-1803743, "Discussion on Enhancements to Measurement Report Mechanism for UAV", NTT DoCoMo, Inc., 3GPP TSG RAN WG2 Meeting #101, Athens, Greece, Feb. 26-Mar. 2, 2018, pp. 1-10.
3rd Generation Partnership Project (3GPP), R2-1804512, "Report of Email Discussion [101#75][eV2x] Additional Carrier Reselection Triggering", Qualcomm Incorporated (Rapporteur), 3GPP TSG-RAN2 Meeting 101bis, Sanya, China, Apr. 16-20, 2018, pp. 1-22.
3rd Generation Partnership Project (3GPP), R2-1804638, "Remaining Issues on Tx Carrier Selection", Huawei, HiSilicon, 3GPP TSG-RAN WG2 Meeting #101bis, Sanya, China, Apr. 16-20, 2018, pp. 1-3.
3rd Generation Partnership Project (3GPP), R2-1805350, "Discussion on Sidelink Packet Duplication for Mode 3", Huawei, HiSilicon, 3GPP TSG-RAN WG2 Meeting #101bis, Sanya, China, Apr. 16-20, 2018, pp. 1-3.
3rd Generation Partnership Project (3GPP), R2-1805542, "Packet Duplication for Mode 4 UEs", Intel Corporation, 3GPP TSG-RAN WG2 Meeting 101bis, Sanya, China, Apr. 16-20, 2018, pp. 1-2.
3rd Generation Partnership Project (3GPP), R2-1805719, "Report from [101#72][LTE/V2X] Packet Duplication", Ericsson (Rapporteur), 3GPP TSG-RAN WG2 #101-Bis, Sanya, China, Apr. 16-20, 2018, pp. 1-18.
3rd Generation Partnership Project (3GPP), R2-1805722, "Avoid Frequent Sidelink Carrier Switching", Ericsson, 3GPP TSG-RAN WG2 #101-Bis, Sanya, China, Apr. 16-20, 2018, pp. 1-3.
3rd Generation Partnership Project (3GPP), R2-1805741, "Sidelink Carrier Selection Criteria for TX", Ericsson, 3GPP TSG-RAN WG2 #101-Bis, Sanya, China, Apr. 16-20, 2018, pp. 1-4.
3rd Generation Partnership Project (3GPP), R2-1808562, "MAC Open Issues for eV2X", LG Electronics Inc., 3GPP TSG-RAN2#102, Busan, Republic of Korea, May 21-25, 2018, pp. 1-2.
3rd Generation Partnership Project (3GPP), TR 23.703 V12.0.0, "Technical Specification Group Services and System Aspects, Study on Architecture Enhancements to Support, Proximity-based Services (ProSe) (Release 12)", Feb. 2014, pp. 1-324.
3rd Generation Partnership Project (3GPP), TR 36.777 V15.0.0, "Technical Specification Group Radio Access Network, Study on Enhanced LTE Support for Aerial Vehicles (Release 15)", Dec. 2017, pp. 1-89.
3rd Generation Partnership Project (3GPP), TS 22.186 V15.2.0, "Technical Specification Group Services and System Aspects, Enhancement of 3GPP Support for V2X Scenarios, Stage 1 (Release 15)", Sep. 2017, pp. 1-16.
3rd Generation Partnership Project (3GPP), TS 36.216 V15.0.0, "Technical Specification Group Radio Access Network, Evolved Universal Terrestrial Radio Access (E-UTRA), Physical Layer for Relaying Operation (Release 15)", Jun. 2018, pp. 1-16.
3rd Generation Partnership Project (3GPP), TS 36.304 V14.0.0, "Technical Specification Group Radio Access Network, Evolved Universal Terrestrial Radio Access (E-UTRA), User Equipment (UE) Procedures in Idle Mode (Release 14)", Sep. 2016, pp. 1-46.
3rd Generation Partnership Project (3GPP), TS 36.321 V14.4.0, "Technical Specification Group Radio Access Network, Evolved Universal Terrestrial Radio Access (E-UTRA), Medium Access Control (MAC) Protocol Specification (Release 14)", Sep. 2017, pp. 1-108.
3rd Generation Partnership Project (3GPP), TS 36.331 V14.0.0, "Technical Specification Group Radio Access Network, Evolved Universal Terrestrial Radio Access (E-UTRA), Radio Resource Control (RRC), Protocol Specification (Release 14)", Sep. 2016, pp. 1-644.

* cited by examiner

CARRIER AGGREGATION FOR WIRELESS TRANSMIT/RECEIVE UNIT

CROSS REFERENCE

This is the National Stage Entry under 35 U.S.C. § 371 of Patent Cooperation Treaty Application No. PCT/US2019/045475, filed Aug. 7, 2019, which application claims the benefit of U.S. Provisional Application No. 62/716,706, filed on Aug. 9, 2018, the contents of which are incorporated by reference herein.

BACKGROUND

A wireless transmit/receive unit (WTRU) may include an unmanned aerial vehicle (UAV), which may be also known as a drone. A WTRU, such as an UAV or a drone, may be a deeply disruptive technology that is spanning into one or more industries, such as parcel delivery, oil and gas inspection, agriculture, surveillance, photography, and/or the like. In order to enable WTRUs to be deployed to a multitude of applications, the WTRUs may be capable of being operated beyond visual line of sight (BVLOS). The latency and reliability for providing command, control and communications (C3) and detect and avoid (DAA) services to the WTRUs may be stringent. Terrestrial cellular infrastructure may provide coverage, C3, and/or DAA services to WTRUs to enable reliable BVLOS operations.

Enabling WTRU communications, such as drone communications, may include aspects affecting operation on the Uu interface (e.g., the radio interface between a user equipment/WTRU/UAV and a radio access network (RAN) node such as an eNB or gNB). For example, a WTRU may be configured to send and/or receive communications that support UAV operations, such as communication that support NASA unmanned aircraft system (UAS) traffic management (UTM) functions. Further, direct WTRU-to-WTRU communications (e.g., UAV-to-UAV communications) may be utilized to enable safe WTRU operations and/or to enable detect and avoid (DAA) functionalities. For example, WTRU communications may include automatic dependent surveillance-broadcast (ADS-B) like communications, which involves exchanging situational awareness information, such as position, velocity, intent, and/or the like. ADS-B like communications may involve exchanging sensor information for enhanced situational awareness.

SUMMARY

Systems, methods, and/or instrumentalities are disclosed for evaluating and managing radio resources, for example resources used to support one or more communications between a wireless transmit/receive unit (WTRU) and a radio access network (RAN) and/or communications directly between multiple WTRUs. The techniques and procedures described herein may be used by WTRUs that are implement on unmanned aerial vehicles (UAVs) and/or any type of WTRU.

WTRUs/UAVs may cooperate to exchange channel busy ratio (CBR) information and/or CBR statistics of radio resources. For example, a WTRU/UAV may send and/or receive CBR information from one or more (e.g., potentially all) the carriers that the WTRUs/UAV monitors to/from other WTRUs/UAVs. The CBR information may be used carrier selection/carrier reselection. The CBR information may be related to Uu interface resources or sidelink (e.g., WTRU-to_WTRU direct communication) resources. For example, a WTRU/UAV may transmit relevant CBRs of one or more (e.g., all) monitored carriers on a transmitting carrier. Distributed CBR exchange may result in an enhanced CBR for carriers since the WTRUs can aggregate CBR statistics generated by other WTRUs. WTRUs/UAVs with differing capabilities may make informed carrier selection/carrier reselection decisions based on the aggregated information. For example, the WTRUs/UAVs with different capabilities may make informed carrier selection/reselection based on the distributed CBR exchanges of the carriers.

By receiving channel usage statistics (e.g., CBR) from other WTRUs, a WTRU may learn about radio usage of carriers it is not currently monitoring and/or may modify direct CBR measurements performed at the WTRU to take into account the statistics of other WTRUs monitoring the same carrier. Further, by distributing these continuously updated usage statistics to other WTRUs, multiple devices may obtain more accurate, timely, and/or useful statistics about both carriers the devices are currently monitoring and/or carriers not currently being monitored.

For examples, CBR may refer to a report that a WTRU/UAV transmits that includes information about channel usage. The report may include one or more parameters, such as the channel busy ratio, channel occupancy ratio, and/or the like. The WTRUs/UAVs may transmit the reports regarding one or more carrier(s) (e.g., a serving carrier). The WTRUs/UAVs may transmit the reports regarding a serving carrier in addition to one or more monitored carriers that are not currently serving the WTRU.

A network (e.g., eNB or gNB, etc.) may provide one or more inputs on carrier selection. For example, a network may provide one or more inputs on carrier selection based on the congestion that the network infers (e.g., through the CBR measurements reported by the WTRUs/UAVs and/or through its own measurements).

In examples, WTRUs/UAVs may report absolute CBRs or CBR statistics (e.g., that are monitored and/or are transmitted) to the eNB. Based on the measurements reported by one or more WTRUs/UAVs on different carriers, the eNB may aggregate the measurements and send the aggregated measurement back in the appropriate carriers to WTRUs/UAVs that may be affected.

In examples, a network (e.g., eNB, gNB, etc.) may provide weights associated to a carrier for a service to aid the WTRUs/UAVs in carrier selection (e.g., and/or carrier reselection).

MAC/PHY layers may be configured to perform transmit adaptation during packet data convergence protocol (PDCP) packet duplication. For example, the carrier aggregation capability of receivers may be considered to adapt the number of transmissions per carrier. Based on the carrier aggregation capability of the receivers, the number of transmissions at one or more (e.g., all) carrier may be attempted to be optimized jointly across carriers.

WTRUs/UAVs may cooperate to exchange carrier aggregation capability information. WTRUs/UAVs may infer and/or determine the aggregated capability information of one or more (e.g., all) other WTRUs/UAVs in its coverage area. The aggregated capability information may enable the source WTRU/UAV to constrain its transmission of a service to the carriers that are supported and/or tuned to/by the other WTRUs/UAVs. The source WTRU/UAV may be capable of transmitting in a greater number of carriers than its intended target WTRUs/UAVs. Based on the inferred carrier capability, adapting the number of transmissions may be performed per carrier.

Carrier aggregation for sidelinks may perform relaying. For example, service and/or carrier forwarding request may be signaled, e.g., via position and intent broadcast service (PIBS) messaging. One or more (e.g., all) carrier relaying forwarding request may be signaled, e.g., via PIBS.

A WTRU may be configured to perform contention resolution for sidelink resources. For example, the contention resolution process implemented by the WTRU may be associated with a duration M. The duration M may be a contention resolution frame (e.g., that starts when SFN mod M==0). The WTRU may attempt to perform contention resolution for one more resources and/or may attempt to determine the best/most suitable transmission resource to use at the expiry of a N slot contention resolution window. The N contention resolution window may change dynamically. As described herein, the contention resolution frame (e.g., duration M) may be semi-static. The contention resolution frame (e.g., duration M) may be updated based on the gNB. For example, the contention resolution frame (e.g., duration M) may be updated based on the gNB via system information block (SIB) updates.

Carrier selection may be based on class based offsets for UAV/WTRU. For example, a serving frequency may provide information on one or more non-serving frequencies that support sidelink. A UAV/WTRU may determine whether to perform sidelink with another carrier based on the provided information (e.g., provided information indicates that the frequency does not support sidelink).

A WTRU may be configured to generate an aggregated carrier usage report for sidelink resources of one or more carriers. A WTRU may monitor sidelink resources of a set of one or more carriers (e.g., a first set of one or more carriers). For example, the monitored sidelink resources of the set of one or more carriers to which the WTRU has a connection (e.g., serving carriers). The WTRU may generate resource usage parameters associated with the sidelink resources of the set of one or more carriers that are monitored.

The WTRU may receive one or more resource usage parameters from one or more other WTRUs (e.g., one or more WTRUs other than the WTRU monitoring sidelink resource of the set of one or more carriers). The one or more resource usage parameters received from one or more other WTRUs may be or may include the usage parameters for sidelink resources of a set of one or more carriers (e.g., a second set of one or more carriers). The first and second set of carriers may completely overlap (e.g., the first and second set of carriers correspond to the same carriers), may partially overlap (e.g., there is at least one common carrier comprised in the first and second sets of carriers), or may be non-overlapping (e.g. there may be no common carriers in the first and second sets of carriers).

The WTRU may generate an aggregated carrier usage report based on weighting criteria. The weighting criteria may be associated with one or more of the monitored sidelink resources (e.g., associated with the first set of one or more carriers) and the one or more resource usage parameters of the sidelink resources (e.g., associated with the second set of one or more carriers). The weighting criteria may be or may be based on one or more of reference signal received power (RSRP) information, staleness information, or frequency information. The frequency information may be associated with side link resources of the carriers. For example, the frequency information may be associated with the monitored sidelink resources (e.g., of the first set of one or more carriers). For example, the frequency information may be associated with resource usage parameters of the sidelink resources (e.g., of the second set of one or more carriers). The staleness information may be or may include an amount of time (e.g., a duration of time) that the WTRU monitored the sidelink resources, and amount of time since the statistics were gathered, and/or and amount of time since the WTRU received the one or more resource usage parameters. The frequency information may be or may include how often the WTRU monitors the sidelink resources (e.g., of the first set of one or more carriers) and/or receives the one or more resource usage parameters (e.g., the sidelink resources of the second set of one or more carriers). The aggregated carrier usage report may be or may include channel busy ratio, channel occupancy ratio, a channel ratio associated with the sidelink resources of the first set of one or more carriers and the second set of one or more carriers, and/or other usage measurements/statistics.

Based on the weighting criteria, the WTRU may assign weights when generating the aggregated carrier usage report. The WTRU may assign a lower weight if the weighting criteria have a low value and assign a higher weight if the weighting criteria have a high value. For example, the WTRU may perform a RSRP measurement on one or more of the monitored sidelink resources of the first set of one or more carriers and the sidelink resources of the second set of one or more carriers. If the RSRP measurement is low for one of the sidelink resources, the WTRU may assign a low weight (e.g., compare to the RSRP measurement having higher value for other sidelink resources). The WTRU may generate the aggregated carrier usage report based on the assigned weight. In this manner, RSRP (and/or other weighting) may be used to give precedence to and/or minimize the effect that reports from other WTRUs have on the aggregated usage report. For example, since RSRP may be considered a proxy for distance, greater weights may be given to reports received from other WTRUs that are close to the WTRU receiving the statistics, e.g., since these WTRUs may have channels more similar to those seen by the receiving WTRU.

The WTRU may transmit the aggregated carrier usage report. For example, the WTRU may transmit the aggregated carrier usage report to one or more the sidelink resources of the first set of one or more carriers and the second set of one or more carriers. The WTRU may transmit the aggregated carrier usage report periodically (e.g., to one or more the sidelink resources of the first set of one or more carriers and the second set of one or more carriers). Based on the aggregated carrier usage report, the WTRU may perform a sidelink carrier selection.

BRIEF DESCRIPTION OF THE DRAWINGS

FIG. 13 illustrates an example MAC-CE of FIG. 12 sent as one or more (e.g., two) MAC-CEs.

FIG. 16 illustrates contention resolution at MAC layer.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
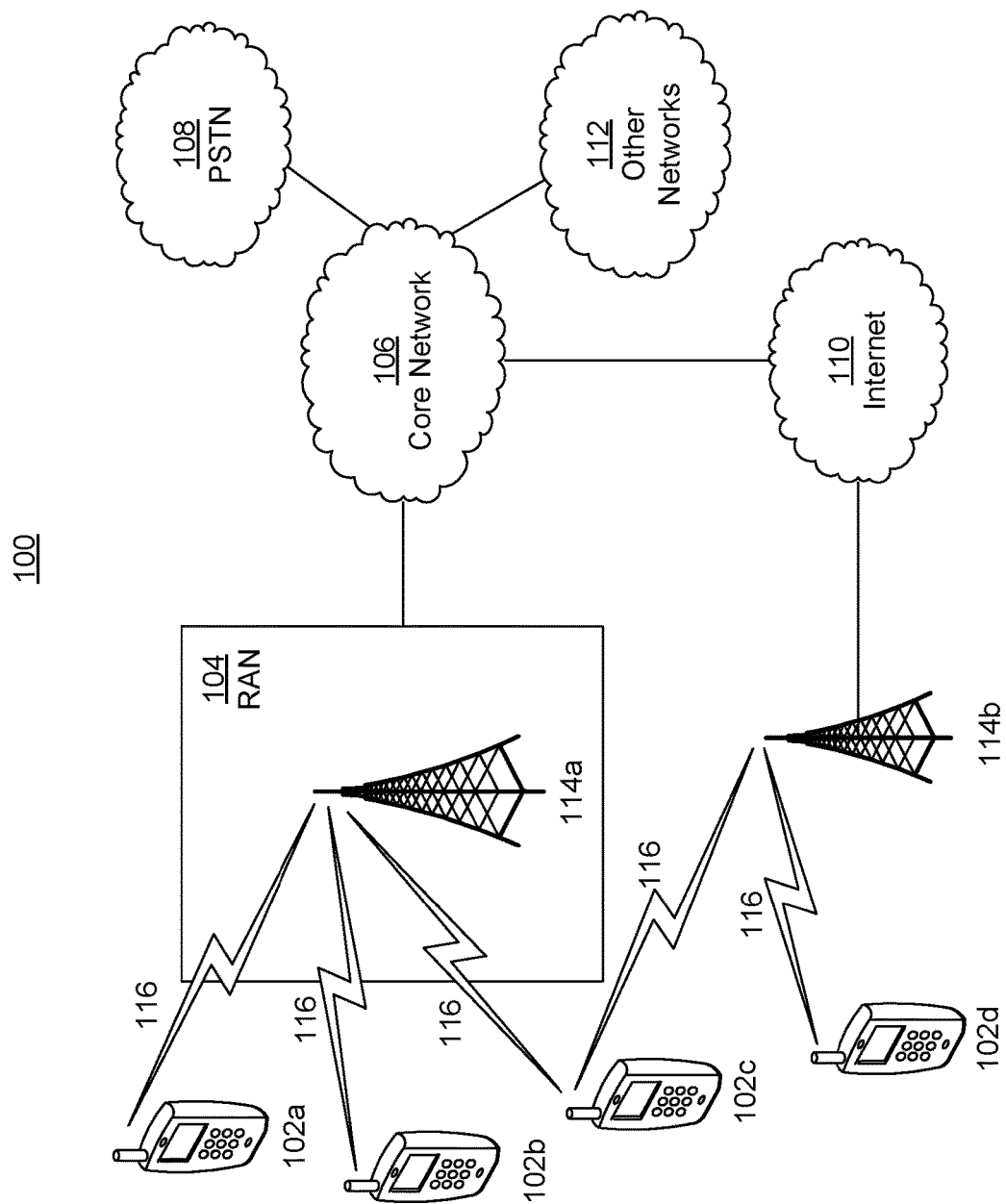
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone/UAV, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE and/or UAV.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi™), IEEE 802.16 (i.e., Worldwide Interoperability for Microwave Access (WiMAX™)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX™, E-UTRA, or WiFi™ radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
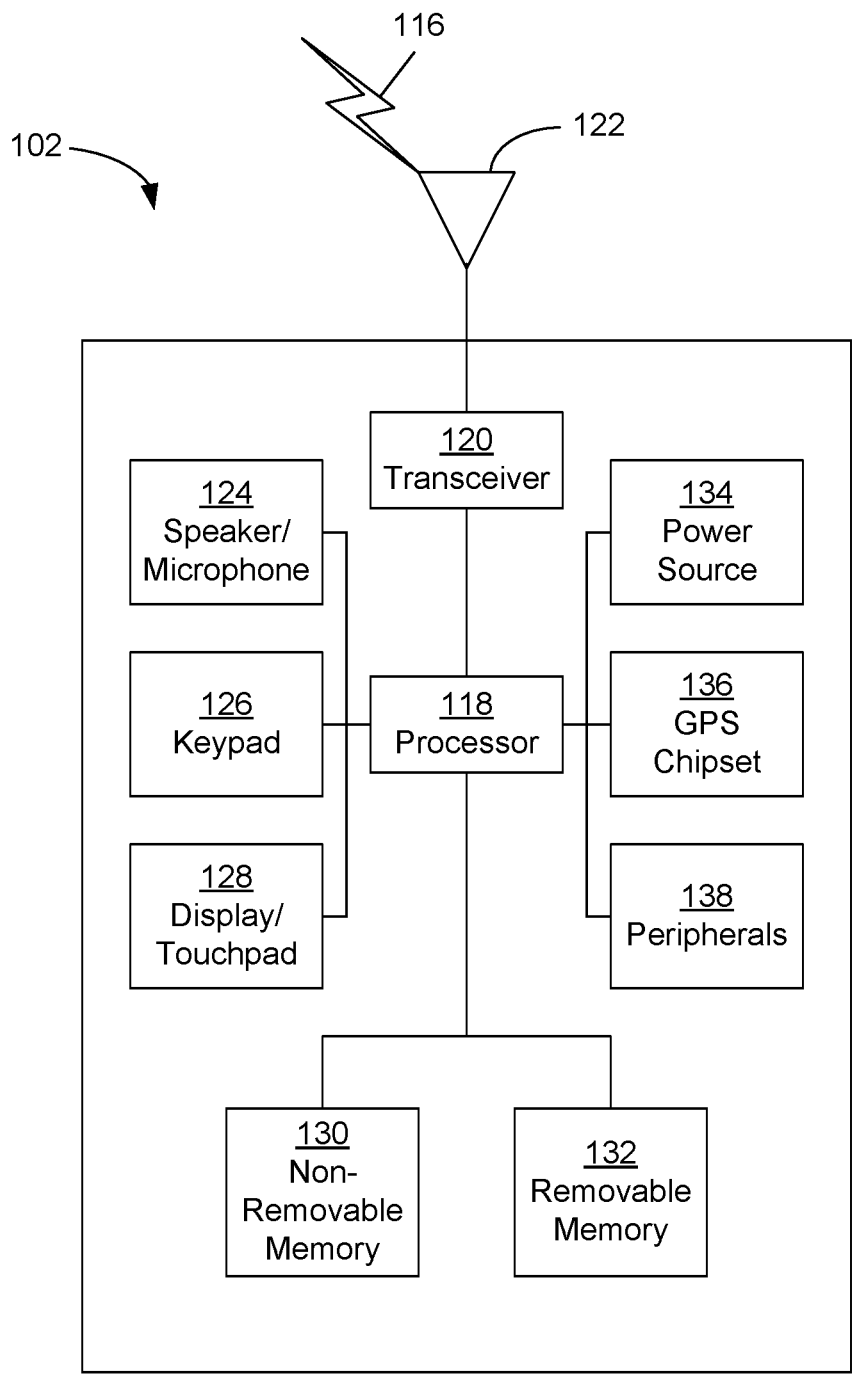
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
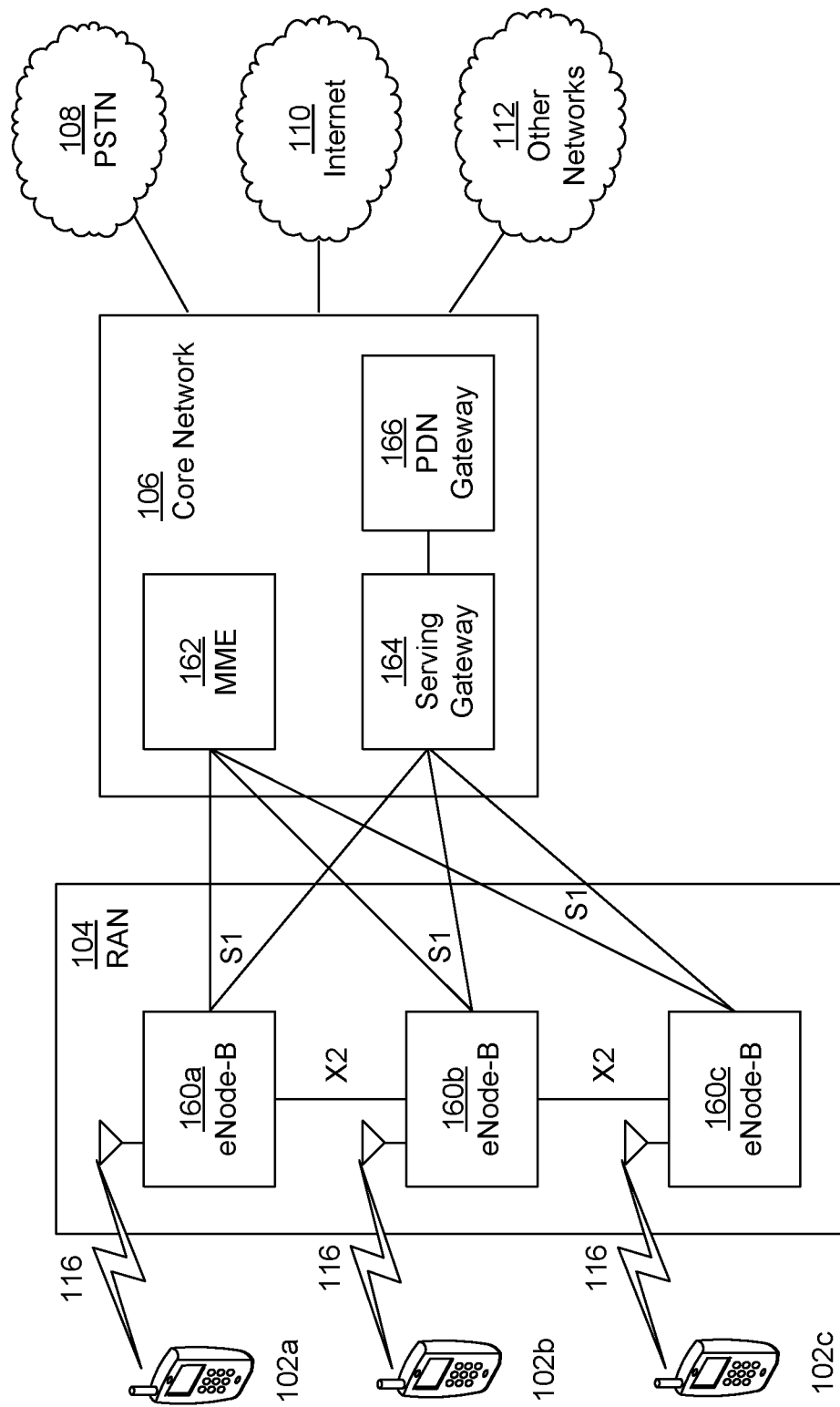
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
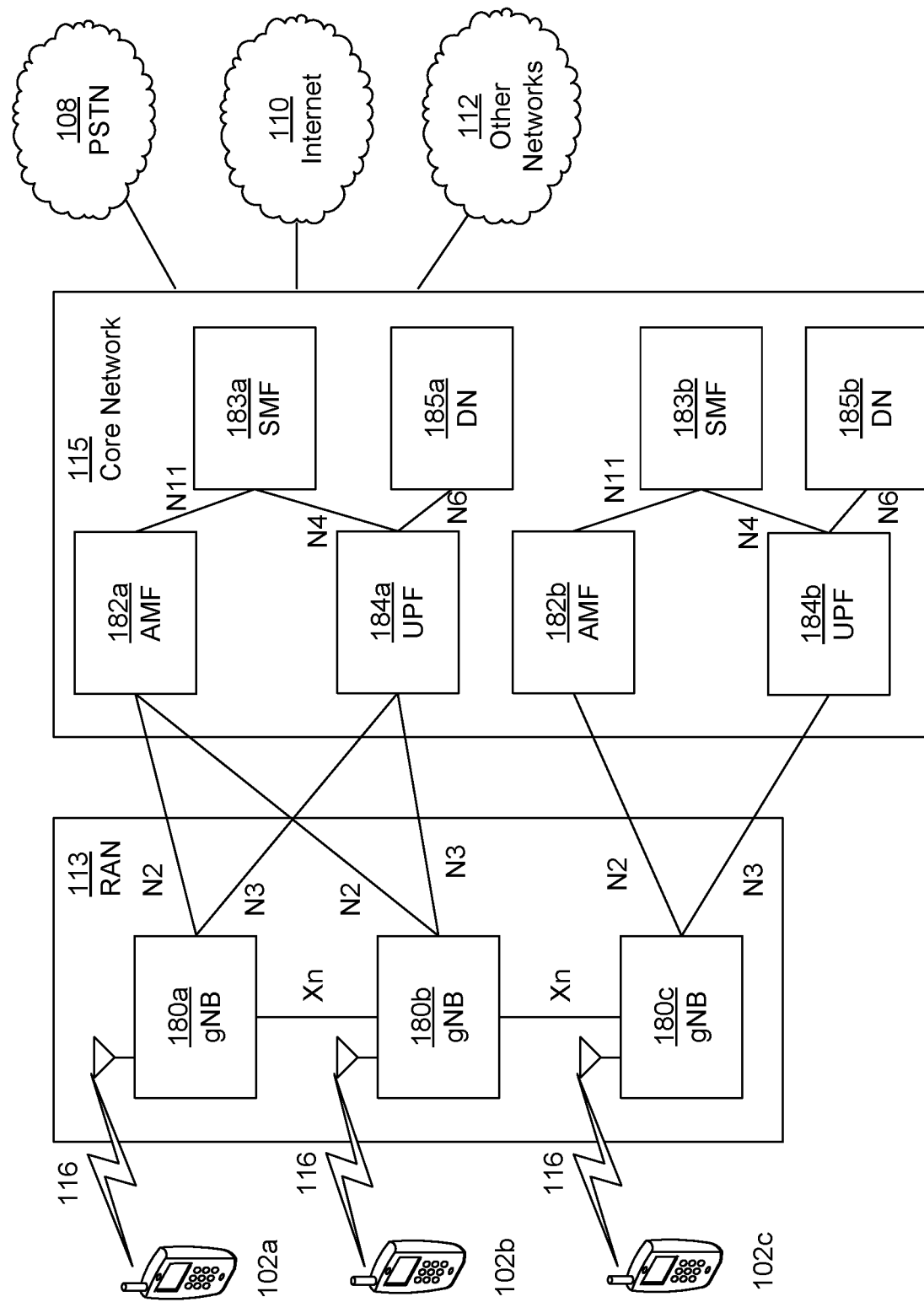
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi™ radio technology.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although the techniques and procedures described herein may be implemented by WTRUs comprised in UAVs, they may also be applicable to any type of WTRU. For example, although the examples and use cases described herein may refer to UAVs by way of example, they are not meant to be limited only to UAVs. For example, the techniques described herein may be applicable to any type of WTRU, such as a UE, a vehicle-to-vehicle (V2V) WTRU, a vehicle-to-everything (V2X) WTRU, and/or the like. The terms WTRU, UAV, mobile, handset, UE, V2X device, and/or the like may be used interchangeably herein. Unless specifically noted, the techniques described herein may be applicable to any type of WTRUs.

Various types of WTRUs (e.g., UAV type WTRUs and non-UAV type WTRUs) may be configured to use a the terrestrial cellular network and procedures may be defined to ensure the coexistence between various types of cellular users.

As an example, situational awareness may be improved by addressing exchange of sensor information in vehicle-to-vehicle (V2V) and/or vehicle-to-everything (V2X) applications. However, situation awareness data exchange may lead to high data rate requirements. The high data rate requirement (e.g., for V2V and/or V2X) may be similar to, if not more stringent/demanding than, the case of other types of WTRUs, such as unmanned aerial vehicles (UAVs) and/or drones, that operate in beyond visual line of sight (BVLOS) conditions. With the envisioned use for deploying WTRUs/UAVs in photography and/or videography where WTRUs may transmit a live feed to a cloud, the bandwidth requirements to support such operations may be expected to increase (e.g., dramatically increase). To enable the example and/or requirements described herein, one or more of the following features may be implicated in order to support such use cases: e.g., in V2X Phase 2 (eV2X); carrier aggregation (e.g., up to 8 PC5 carriers for sidelink carrier aggregation); 64 quadrature amplitude modulation (QAM); reduce time (e.g., maximum time) between packet arrival at Layer 1 and resource selected for transmission; radio resource pool sharing between WTRUs using mode 3 and WTRUs using mode 4; the feasibility and gain of PC5 operation with transmit diversity, assuming the PC5 functionality may co-exist in the same resource pools as functionality (e.g., Rel-14 functionality) and/or may use the same scheduling assignment format (e.g., which may be decoded by WTRUs), without causing significant degradation to PC5 operation; and/or the feasibility and gain of PC5 operation with short transmission time interval (TTI), e.g., assuming the PC5 functionality may co-exist in the same resource pools as functionality (e.g., Rel-14 functionality) with and/or without using the same scheduling assignment format.

A WTRU, such as an aerial vehicle or a UAV, may perform carrier aggregation (e.g., for aerial vehicle operation(s)). For example, the carrier aggregation may be performed by aggregating Uu interface resources and/or by aggregating PC5 interface resources (e.g., sidelink resources).

A UAV/WTRU may transmit carrier selection for sidelink carrier aggregation. A WTRU may perform carrier selection for a transmission based on a combination of channel busy ratio-ProSe per packet priority (CBR-PPPP). For example, a list of allowed CBR/PPPP combination (e.g., CBR-PPPP-TxConfigList) may be maintained at the WTRU and may include combinations of PPPP/channel busy ratio (CBR) ranges that indicate whether sidelink transmissions are allowed in a given carrier. For example, certain packets associated with a first PPPP may be allowed to be transmitted on certain carriers when first CBR requirements are satisfied, and other packets associated with a second PPPP may be allowed to be transmitted on certain carriers when second CBR requirements are satisfied, etc. A hysteresis margin may be included in CBR-PPPP_Txconfig to configure the WTRU to select the same carrier as was used for a previous transmission, for example if the measured CBR at the resource/carrier is lower than the configured threshold assuming the provided hysteresis value.

The carrier to be selected may not depend (e.g., may not only depend) on the CBR-PPPP combination. For example, the carrier to be selected may depend on the ProSe per packet reliability (PPPR). If a high reliability is desired (e.g., WTRUs/UAVs during a resolution advisory (RA) phase), the CBR levels required may be stringent (e.g., to guarantee reliable delivery to receivers), which may induce the carrier selection.

Resource and/or sub-channel selection in sidelink may be based on sensing (e.g., continuously sensing) a channel for at least 1,000 subframes (e.g., per one second) to get an estimate (e.g., a good estimate) of the resources available for transmission. One or more subchannels may be reserved.

Relays on group communications/sidelink perspective may address carrier aggregation/service type aspects.

UAV-to-UAV communications may enable detect and avoid (DAA) for safe WTRU/UAV operation and may integrate into a terrestrial network. The UAV-to-UAV communications may include exchanging situational awareness information and/or being able to resolve conflicts deterministically, if the conflicts arise. Position and intent broadcast services (PIBS) and resolution advisory-PIBS (RA-PIBS) may form the basis of UAV-UAV communications.

A WTRU/UAV may use PIBS for UAV-UAV communications.

Figure 2:
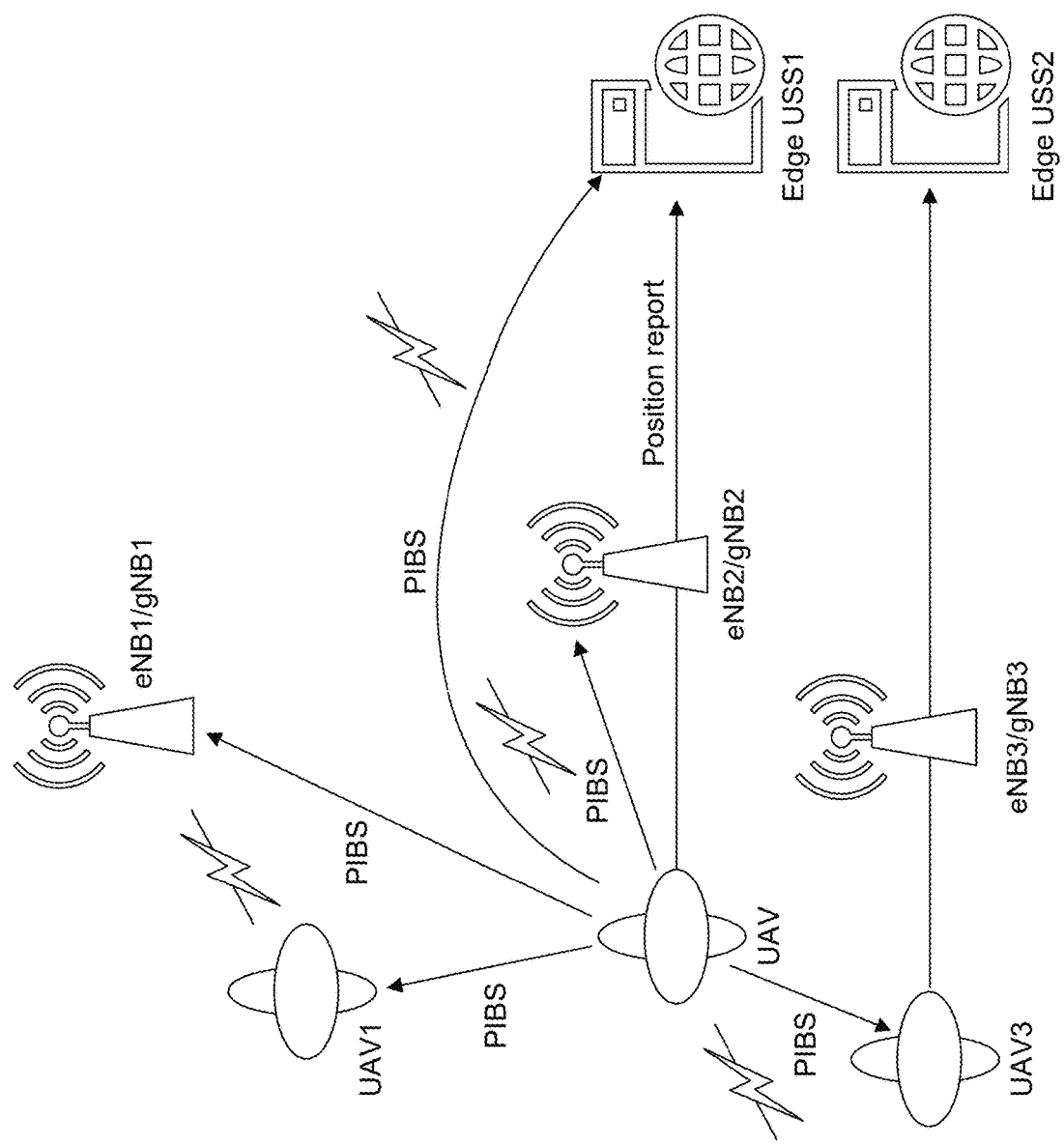
FIG. 2 illustrates an example outline of position and intent broadcast service (PIBS) transmission/reception architecture.

In a manned aviation system, an automatic dependent surveillance-broadcast (ADS-B) may be a surveillance technology that an aircraft determines its position via satellite navigation and periodically broadcasts its position, enabling the aircraft to be tracked by a ground based equipment and/or other aircrafts receiving the broadcast. The PIBS in an unmanned aviation system may be similar to the ADS-B (e.g., in manned systems) or cooperative awareness message (e.g., in a dedicated short range communication (DSRC)/V2X systems). FIG. 2 illustrates an example outline of PIBS transmission/reception architecture. As shown in FIG. 2, PIBS messages may be exchanged between WTRUs/UAVs and/or between a WTRU and a RAN node (e.g., eNB/gNB).

A WTRU/UAV, whose mission is approved and has commenced operation of a particular mission, may transmit (e.g., may be mandated to transmit) PIBS, e.g., at a configured periodicity. In examples, PIBS may be transmitted by a WTRU/UAV aperiodically. A WTRU/UAV may transmit PIBS when an event is triggered. For example, when a WTRU/UAV observes a required navigational performance (RNP) metric drop by a preconfigured threshold, the WTRU/UAV may trigger (e.g., obligated to trigger) an event, e.g., via a PIBS indicating such a departure in the RNP. The PIBS may be transmitted as an internet protocol (IP) payload with a suitable transport layer, for example, a user datagram protocol (UDP) and/or a transmission control protocol (TCP). The PIBS payload may be variable in length and/or include one or more of the following parameters. The PIBS payload may include a source ID. The PIBS payload may include WTRU/UAV class information. The PIBS payload may include current position. The PIBS payload may include generation time. The PIBS payload may include heading information. The PIBS payload may include resolution advisory flag (RA-Flag). The PIBS payload may include an emergency flag.

Source ID information in the PIBS payload may include an alpha-numeric identifier. The alpha-numeric identifier may uniquely identify a WTRU/UAV and may be known at an unmanned aircraft system (UAS) traffic management (UTM). The source ID may be an identity that is registered with an organization, such as the International Civil Aviation Organization (ICAO).

WTRU/UAV class information in the PIBS payload may include the type and/or class of UAV that unambiguously identifies the certified capabilities of the WTRU/UAV.

Current position information in the PIBS payload may include a tuple, e.g., including latitude, longitude, and/or altitude of a WTRU/UAV.

Generation time information in the PIBS payload may include a time stamp in GPS time format when a particular PIBS message instance was generated.

Heading information in the PIBS payload may include one or more subsequent waypoints on an intended path expressed as a tuple, e.g., including latitude, longitude, and/or altitude. The number of such subsequent waypoints to be included in PIBS may be configured by the UTM, e.g., via parameter headingReport (e.g., before a mission commences or during the mission).

RA-Flag information in the PIBS payload may include a Boolean parameter indicating whether a WTRU/UAV is currently seeking and/or addressing a RA.

Emergency flag information in the PIBS payload may include a Boolean parameter indicating whether a WTRU/UAV is currently in an emergent situation.

A WTRU/UAV that operates in an airspace may be mandated by regulations to transmit PIBS.

Resolution advisory-PIBS for DAA may form the basis of UAV-UAV communications.

When one or more (e.g., multiple) aircrafts are involved in a collision course, traffic and collision avoidance system (TCAS) protocol may be used in manned aviation systems to resolve the collision. A message(s) exchanged between the aircrafts during the TCAS phase may be referred to as resolution advisory (RA). RA may indicate the resolutions that an aircraft (e.g., a master aircraft) provides to other aircraft (e.g., a slave aircraft) to avoid an anticipated collision.

In unmanned aviation systems, the density of the WTRU/aerial vehicles may be expected to be high (e.g., higher than that of the manned aviation systems), and the DAA functionalities may be envisioned to be more sophisticated than that of the manned DAA functionalities. RA-PIBS may be referred to one or more messages that are exchanged between WTRUs/UAVs during the collision avoidance phase. The manner in which RAs are expected to be provided may differ between the manned and the unmanned systems from the DAA perspective. In the manned aviation systems, the RAs may be provided for pairs of aircrafts due to fact that the probability of encountering situations where more than two aircrafts are involved in a collision is low. For example, the deployment density of the manned aircrafts may be low (e.g., much lower than what is envisioned for the unmanned systems). In the case of the unmanned systems, providing pairwise RAs to resolve a collision may take long time (e.g., much longer time) to converge. In some cases, providing the pairwise RAs to resolve a collision may fail to converge.

Figure 3:
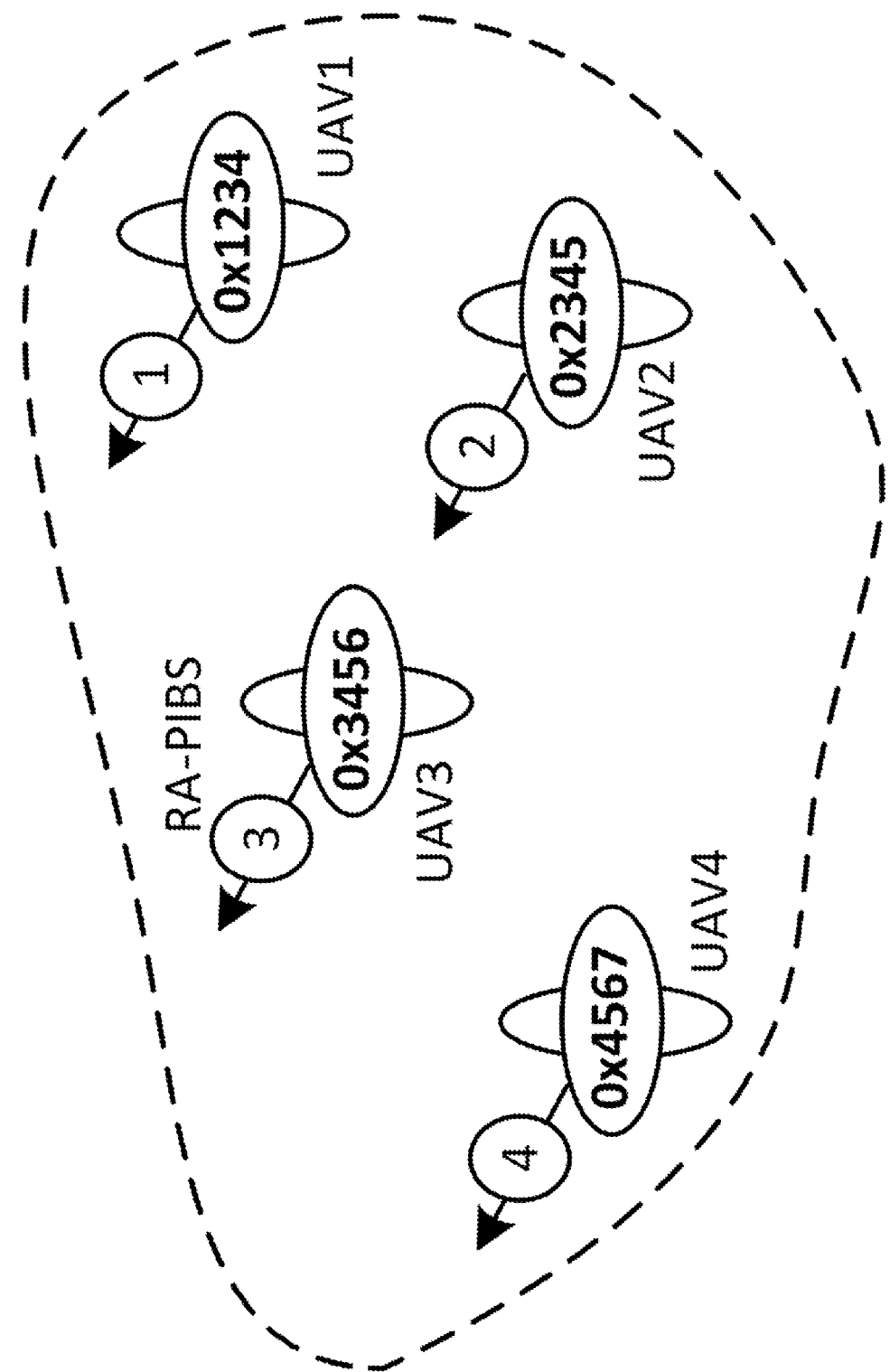
FIG. 3 illustrates an example resolution advisory (RA) and RA-PIBS transmission for one or more (e.g., multiple) WTRUs/unmanned aerial vehicles (UAVs).

FIG. 3 illustrates an example RA and RA-PIBS transmission for one or more (e.g., multiple) WTRUs/UAVs. As shown in FIG. 3, four WTRUs/UAVs (e.g., UAV1, UAV2, UAV3, and UAV4) may be in collision course with one another. $\binom{4}{2}$ pairwise RAs may be computed to determine RA for the four UAVs shown in this example. There is no guarantee that the solution obtained in the first iteration of 6 pairwise RAs may be admissible. Further iterations may be performed to optimize the selected solutions, which may result in incurring 6× pairwise RAs, where x may be the number of iterations. A group RA may be envision where RAs may be provided for a group including 2 or more WTRUs/UAVs. The group RA described herein may reduce (e.g., significantly reduce) the convergence time. For the example shown in FIG. 3, a group RA may resolve (e.g., required to resolve) the collisions for all the 4 WTRUs/UAVs. For a group of arbitrary size, a group RA, such as one group RA, may be sufficient.

From a deployment perspective, WTRUs/UAVs may be classified into one or more different classes, e.g., based on their capability levels. For example, the WTRUs/UAVs may be classified into different class(es) based on sensors, power, advanced DAA, and/or the like. The WTRUs/UAVs may be mandated to transmit/receive PIBS. For example, while PIBS functionality may be mandated, the DAA related functionalities may be optional. The WTRUs/UAVs may not have the ability to perform DAA. For the WTRUs/UAVs that do not have the ability to perform DAA, the WTRUs/UAVs may be made aware of impending danger/collision, for example, by setting the RA-Flag=1 (e.g., as described herein). The WTRUs/UAVs may set the RA-Flag to 1 in the PIBS, e.g., seeking one or more WTRUs/UAVs that provide relay functionality for DAA and/or seeking alternate safety measures (e.g., land on the ground).

PIBS may be mandated for one or more (e.g., every) WTRUs/UAVs, while one or more DAA functionalities may be supported by a different and/or a subset of WTRUs.

PIBS and DAA may be treated as two different services. For example, PIBS may be serviced in a dedicated carrier (e.g., to provide reliable guarantees to low end WTRUs/UAVs and/or as per FAA regulations).

DAA for WTRUs/UAVs may involve a cluster/group formation and/or a group messaging (e.g., broadcast/multicast) to resolve collisions.

WTRUs/UAVs that are not capable of performing DAA may at least be made aware of the danger of collisions, e.g., via PIBS.

WTRUs/UAVs may perform carrier selection. For example, WTRUs/UAVs may perform rapid and informed carrier selection. For example, the WTRUs/UAVs may performed rapid and informed carrier selection for collision avoidance and/or RA scenarios as described herein. In carrier aggregation, WTRUs/UAVs may have an option to choose among one or more (e.g., multitude of) carriers. One or more of the following scenarios may be considered. A WTRU/UAV may sense (e.g., continuously sense) a channel to get a good estimate of available resources to know whether the carrier is suitable enough for transmission. Carrier selection may be triggered due to resource reselection and may be frequent. After selecting one or more new carriers, the WTRUs/UAVs may realize that other carriers may lead to a detrimental effect from the latency perspective.

To perform carrier selection, a WTRU/UAV may sense (e.g., may continuously sense) the channel. For example, a WTRU/UAV may continuously sense the channel for at least 1000 subframes (per one second) to get a good estimate of the resources available to know whether the carrier is suitable enough for transmission. The continuous sensing and determination may incur a lot of time, if the WTRU/UAV needs to sense a (e.g., each) carrier to find out and select a carrier that has the desired CBR requirement.

A carrier selection may be triggered due to a resource reselection. For example, if the configured sidelink grant cannot accommodate a radio link control (RLC) service data unit (SDU), carrier reselection may be triggered due to resource reselection. The carrier selection may be frequent if the density of UAVs/WTRUs are high.

After selecting one or more new carriers, the WTRUs/UAVs may realize that other carriers may lead to a detrimental effect from the latency perspective. For example, the WTRUs/UAVs may realize that the selection may lead to a ping-pong like situation that has a detrimental effect from the latency perspective for collision avoidance and/or RA scenarios.

In the one or more scenarios described herein, a blind carrier selection may occur while performing carrier selection for the UAVs/WTRUs, e.g., since CBR information of alternate carriers are missing. For example, CBR information of alternate carriers may be missing other than the ones that UAVs/WTRUs are currently tuned to. The WTRUs/UAVs may perform deterministic and/or an informed carrier selection, e.g., for Mode-3 and/or Mode-4 scenarios. Mode-3 scenario may represent when WTRUs/UAVs are under the control of a network. Mode-4 scenario may represent when WTRUs/UAVs are not under the control of a network, e.g., when the WTRUs/UAVs operate autonomously in out of coverage of the network.

For carrier aggregation enabled WTRUs/UAVs, congestion may be minimized and/or energy efficient may be enhanced.

High reliability may be needed during the RA and/or collision avoidance phase. For example, packet data convergence protocol (PDCP) packet duplication may be performed, e.g., during RA phase across one or more (e.g., all) carriers (e.g., as allowed by the service). Packet duplication may increase congestion and/or traffic for services that need high reliability. A source may know the carrier capability of UAVs/WTRUs in its vicinity. In examples, the source may perform MAC/PHY transmission adaption during the PDCP duplication phase that guarantees the high reliability of one or more (e.g., all) the receivers. In examples, the source may perform MAC/PHY transmission adaptation during the PDCP duplication phase, while minimizing the congestions and/or traffic per carrier and/or energy transmitted by the device. Energy efficient may be achieved while providing required reliability levels for Mode-3 and/or Mode-4 scenarios.

A WTRU/UAV carrier aggregation may use relaying aspects.

A WTRU/UAV may support (e.g., support only) the minimum required capabilities for safe WTRU/UAV operations. WTRUs/UAVs may have different capabilities. For example, a UAV-j may be better equipped and/or may have access to more carriers (e.g., as supported by a service) than a UAV-i. A framework may be implemented where the UAV-i may get access to carriers that the UAV-i does not support (e.g., and/or is required from the service perspective for the UAV-i), by cooperating with the UAV-j. For example, a service may be provided in a set of carriers $\{S\}$. The UAV-i may have access to a subset of carriers $\{A_i\}$, where $A_i \subset S$. The UAV-i may obtain information on a service offered in the carriers that the UAV-i does not have access to: $\{S \setminus A_i\}$.

A WTRU may implement procedures for communications between WTRUs/UAVs at a medium access control (MAC)

layer. For example, a WTRU may be configured to implement a sidelink MAC protocol for contention resolution. When used herein, the term contention resolution may refer to techniques for resolving conflicts when multiple WTRUs are attempting to use the same radio resources. With the envisioned increase in V2V/WTRU/UAV densities, it may be desirable to share resources equitably and/or allocate the resources in a deterministic manner to enhance reliability. A WTRU may be configured with a MAC protocol where WTRUs/UAVs may cooperate to reserve resources. If the WTRUs/UAVs cooperate to reserve resources, a WTRU may transmit (e.g., transmit deterministically) MAC protocol messages in that resource for a preconfigured amount of time. The contention and/or cooperation process, whereby one or more (e.g., multiple) sidelink devices may compete to reserve resources may result in a convergence to a steady-state and/or WTRUs/UAVs may pick unique resources in a distributed framework.

A UAV/WTRU may be configured to use context specific offsets and/or class specific offsets. For example, a WTRU/UAV may perform carrier selection based on context specific offsets for a WTRU. The information about context specific offsets for UAV/WTRU may indicate favorable carrier, e.g., depending on the level of congestion experienced by the UAV/WTRU. The UAV/WTRU context specific offsets and/or the class specific offsets may enable a network to control carrier selection, e.g., based on the contexts of the WTRU and/or the class of the WTRU, respectively. The network may be facilitated to load balance among one or more (e.g., multiple) carriers (e.g., based on the context) and/or may provide a preference to a particular class of device to favor specific carriers for the carrier selection.

Cooperative channel busy ratio (CBR) reports may be exchanged by WTRUs to support carrier selection.

A UAV/WTRU may perform deterministic and/or informed carrier selection. For example, a WTRU/UAV may perform deterministic and/or informed carrier selection for WTRUs/UAVs operating in Mode-4. A WTRU/UAV may select a different carrier. If a WTRU/UAV wants to select to a different carrier, the WTRU/UAV may scan through one or more (e.g., multiple) carriers for that service to determine if the carrier is suitable for transmission. Determining if the carrier is suitable for transmission may include the WTRU/UAV determining usage parameters, such as CBR of the carriers, and/or the resource block availability per carrier, which incurs 100 subframes and 1000 sub-frames, respectively. Performing the determination for one or more (e.g., multiple) carriers may become inefficient from a latency perspective. For example, if the WTRU/UAV is involved in a RA phase, performing the determination for one or more (e.g., multiple) carriers may become inefficient from a latency perspective. Instead of or in addition to a WTRU/UAV trying to blindly choose a carrier to reselect, one or more (e.g., all) WTRUs/UAVs may cooperate to exchange absolute CBR and/or CBR statistics of one or more (e.g., all) the carriers that the WTRUs/UAVs monitor with each other.

Figure 4:
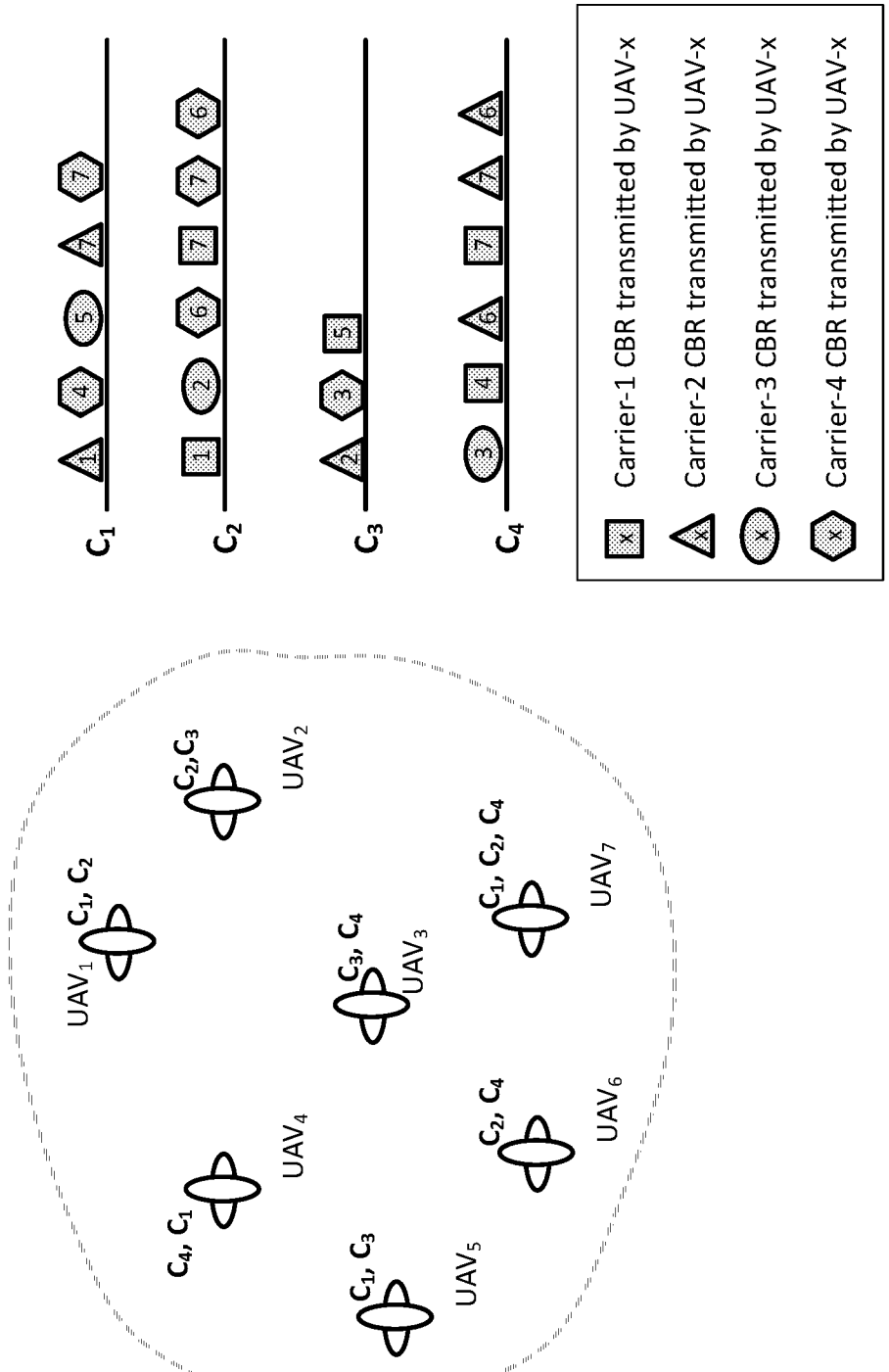
FIG. 4 illustrates an example cooperative channel busy ratio (CBR) exchange for carrier selection/carrier reselection.

FIG. 4 illustrates an example cooperative CBR exchange for carrier selection/carrier reselection. $C_x$ may denote carrier-x. As shown in FIG. 4, seven WTRUs/UAVs (e.g., $UAV_1$ through $UAV_7$) may be tuned to different carriers (e.g., as allowed by the service) and with different capabilities. For example, a $UAV_7$ may have three transmit/receive chains (e.g., $C_1$, $C_2$, and $C_3$), while other UAVs have two transmit/receive chains. As shown in FIG. 4, a $UAV_1$ may be tuned to carriers $C_1$ and $C_2$. A $UAV_2$ may be tuned to carriers $C_2$ and $C_3$, and so forth. If the $UAV_1$ wants to select carriers $C_3$ and/or $C_4$ or if the $UAV_1$ wants to choose the least congested carrier among available carriers, such as $\{C_1,C_2,C_3,C_4\}$, the $UAV_1$ may need to know the CBR statistics of $C_3$ and/or $C_4$. The $UAV_1$ may know the CBR statistics of $C_1$ and/or $C_2$ as the $UAV_1$ is tuned to them already.

In the example illustrated in FIG. 4, a WTRU/UAV may transmit relevant CBRs of one or more (e.g., all) monitored carriers on a transmitting carrier(s). For example, the $UAV_1$ may transmit CBR of carrier-1 (e.g., denoted by square number-1 for the $UAV_1$) in carrier-2, and may transmit CBR of carrier-2 (e.g., denoted by triangle number-1 for the $UAV_1$) in carrier-1. The $UAV_2$ may transmit CBR of carrier-2 (e.g., denoted by triangle number-2 for the $UAV_2$) in carrier-3, and may transmit CBR of carrier-3 (e.g., denoted by ellipse number-2 for the $UAV_2$) in carrier-2. The $UAV_7$ may transmit CBR of carrier-1 in carrier-2 and/or carrier-4, CBR of carrier-2 in carrier-1, and/or carrier-4, and CBR of carrier-4 (e.g., denoted by hexagon number-7 for the $UAV_7$) in carrier-1 and/or carrier-2. Distributed CBR exchange may result in the CBR of carriers-2, 3, and/or 4 known to one or more (e.g., all) UAVs tuned to the carrier-1. Distributed CBR exchange as described herein may result in the CBR of carriers-1, 3, and/or 4 be known to one or more (e.g., all) UAVs tuned to the carrier-2, and so forth. The UAVs with differing capabilities may make an informed carrier selection/carrier reselection), e.g., based on the distributed CBR exchanges.

The usage parameter, such as the CBR, may refer to a report that a WTRU/UAV transmits to one or more carriers. The report may include one or more usage parameters, such as the channel busy ratio, channel occupancy ratio, and/or the like. The WTRUs/UAVs may transmit the reports regarding a transmitting carrier (e.g., a servicing carrier), e.g., in addition to one or more monitored carriers. For example, if a WTRU/UAV is transmitting in $C_0$ and is monitoring $C_1$ and/or $C_2$, the WTRU/UAV may transmit the report about $C_0$ in carrier $C_0$, in addition to transmitting in $C_1$ and/or $C_2$ and so forth.

Resource may be configured for status reporting.

A specific resource(s) may be pre-configured (e.g., out of coverage scenarios), where WTRUs/UAVs may transmit the reports described herein (e.g., CBRs and/or usage parameters) of one or more (e.g., all) the monitored and/or transmitting carriers. In examples, resource allocation for transmission of the reports may be specified by a network, such as an eNB or a gNB. For example, resource allocation for transmission of the reports may be specified by the network through system information messages (e.g., RRC, MAC-CE, and/or the like), when the WTRUs/UAVs are under coverage. In examples, the network may provide a resource pool that is common to one or more (e.g., all) WTRUs in a cell. The WTRUs may infer and/or determine (e.g., implicitly infer and/or determine) the resource where it needs to be transmitting the reports, e.g., depending on parameters such as the WTRU-ID (e.g., international mobile subscriber identity (IMSI)), geographical coordinates, and/or the like. For example, the network may signal the starting resource and/or resource element (e.g., start_resource) that is common to one or more (e.g., all) the WTRUs/UAVs in the cell. A (e.g., each) UAV/WTRU may determine the appropriate resource for transmission based on the following:

Resources used by $UAV_i = (IMS_i + \text{start\_resource}) \mod (\text{number of PRBs}) + \text{geography\_id}$.

The resource pool described herein may include one or more pools that have usage parameters of carriers associated with the WTRUs/UAVs. In examples, a resource pool (e.g., a first resource pool) may be a logical division of resources. In examples, the resource pool may be specific for a WTRU/UAV or a group of WTRUs/UAVs. In examples, the resource pool may be common for WTRUs/UAVs in the cell. In examples, the resource pool at different times may be assigned to different users. A resource pool (e.g., a second resource pool) may be in a different logical division of resources. The first resource pool and the second resource pool may belong to different division of resources pools. The division of resources may include one or more of time, frequency, spatial (e.g., a beam) and/or code resources. The resource pool may include usage parameters of channels and/or subchannels of carriers associated with the WTRUs/UAVs. A group of subchannels, such as contiguous subchannels or non-contiguous subchannels, may be configured as a resource pool. The resource pools may be specific to different sub-geographies within the same cell. For example, the resource pools may be specified by different latitude, longitude, and/or altitude boundaries. A geographic based RNTI may be associated with each of the resource pools and a table lookup may be provided at the time of configuration, system information, and/or by dedicated signaling.

A UAV/WTRU may report based on channel access procedure.

A (e.g., each) WTRU/UAV may report the status of the monitored carrier. A WTRU/UAV may report the status of the monitored carrier periodically. For example, a WTRU/UAV may report the status of the monitored carrier for once every N seconds or a period configured by a network, such as the eNB or the gNB. To limit the traffic due to CBR exchanges, a WTRU/UAV may choose to transmit the reports, such as CBRs and/or usage parameters, of the carrier that the WTRU/UAV monitors probabilistically. For example, a WTRU/UAV may transmit the report of the carrier probabilistically based on the class of the WTRU/UAV. For example, a WTRU/UAV may transmit the report of the carrier probabilistically based on choosing a random number in [0,1] for every TTI and/or checking if the WTRU/UAV meets the probability constraints. Table 1 provides example parameters for probabilistic cooperative and/or distributed CBR exchange.

TABLE 1

Example parameters for probabilistic cooperative/distributed CBR exchange

| WTRU/UAV Class/Priority | Probability |
|---|---|
| Class-1 | 0.4 |
| Class-2 | 0.2 |
| Class-3 | 0.05 |

As shown in Table 1, a class-1 WTRU/UAV may transmit the report that includes usage parameter information, such as CBR, of its monitored carriers based on the probability. A class-1 WTRU/UAV may choose to transmit the CBR of its monitored carriers if the chosen random number (e.g., a random number in [0,1]) is less than 0.4. Class-2 and/or class-3 WTRUs/UAVs may transmit the report that includes usage parameter information, such as CBRs. The Class-2 and/or class-3 WTRUs/UAVs may transmit the reports (e.g., CBRs) if the chosen random number is less than 0.2 or 0.05, respectively. Probability for WTRU/UAV class shown in Table 1 illustrates example probabilities of the WTRUs/UAVs and may have different probabilities.

WTRUs/UAVs may transmit usage parameter reports, such as CBRs, periodically with time periods based on the WTRU/UAV class. For example, Class-i WTRUs/UAVs may transmit the usage report, such as the CBR, with time period $T_i$, where $T_{i+1} > T_i$. The WTRUs/UAVs with higher classes may transmit the usage report more frequently. Class-i may be a higher class than class-i+1.

In examples, WTRUs/UAVs may transmit usage reports (e.g., CBRs) that depends on its subframe number (e.g., TTI mod 3==0). A WTRU/UAV may not transmit one or more (e.g., all) of the monitored CBRs in its transmission opportunity. For example, $S = \{s_1, s_2 \ldots S_k\}$ may denote the monitored set of carriers by a WTRU/UAV. On the first transmission opportunity of the WTRU/UAV, the WTRU/UAV may transmit a usage report (e.g., CBR) of $s_1$. On the next transmission opportunity, the WTRU/UAV may transmit a usage report (e.g., CBR) of $s_2$, and so forth.

The amount of reporting that a WTRU/UAV should perform for a carrier may depend on how many reports that the WTRU/UAV has observed for that carrier from its neighbors. For example, for carrier $C_i$, if the number of reports in a time window T is greater than a threshold (THR), the WTRU/UAV may skip reporting for the carrier $C_i$. The WTRU/UAV may skip reporting for the carrier $C_i$ by pausing and/or abstaining from reporting for the carrier $C_i$. The network (e.g., eNB or gNB) may signal the parameters T and/or THR for a (e.g., each) carrier or a group of carriers.

The WTRU/UAV that is monitoring a carrier may transmit information about the amount of time, number of subframes/frames that the WTRU/UAV has monitored, e.g., as a part of the usage report. The amount of time and/or the number of subframes/frames that the WTRU/UVA has monitored may provide staleness and/or frequency information and may be or may include in the usage report. In examples, a quantization level (e.g., 3 bits) may be used to map the amount of time and/or subframes that are being monitored. The information described herein, provided by the transmitter (e.g., source), may provide the amount of confidence that the receiver may want to attribute to the report when consolidating the reports from its neighbors.

A $UAV_1$ may monitor the CBR/channel ratio (CR) of carrier $C_i$ and/or may transmit the report in carrier $C_j$. A $UAV_2$ may receive this report in carrier $C_j$ and/or may transmit it in carrier $C_k$ ($i \neq j \neq k$).

Figure 19A:
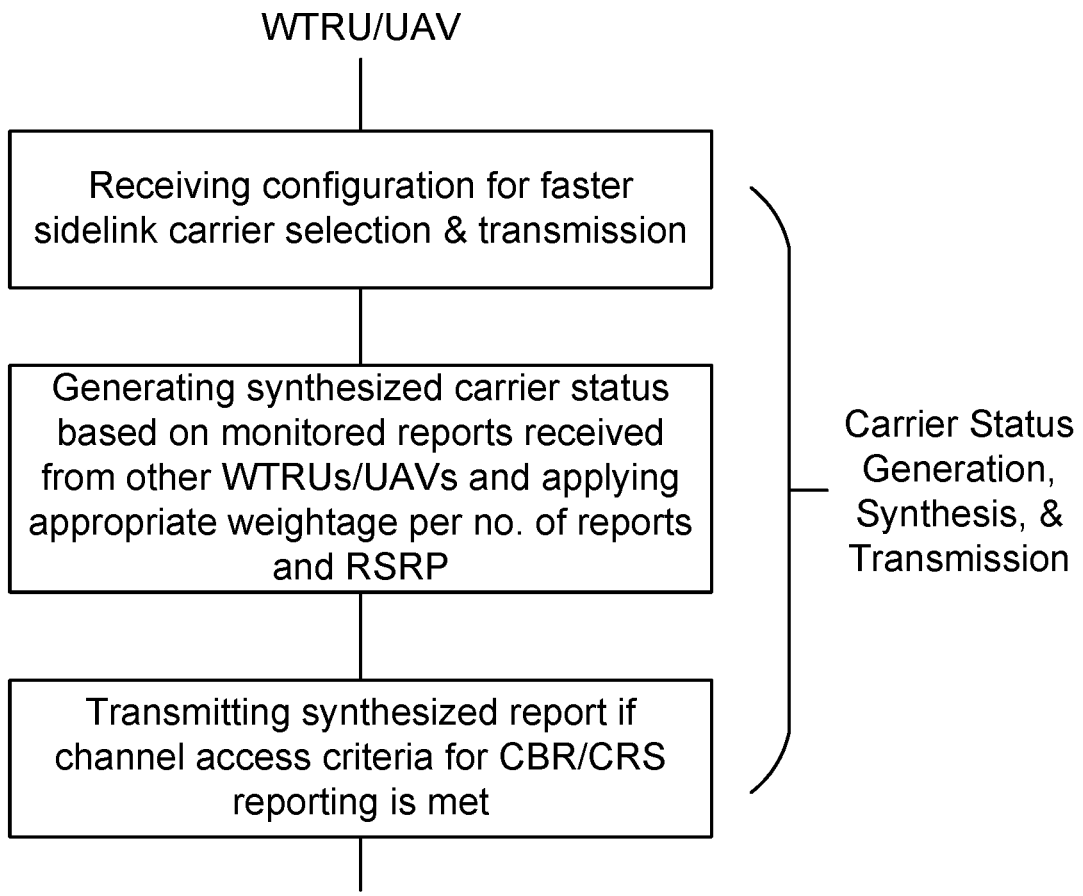
FIG. 19A illustrates an example flowchart of a WTRU/UAV generating a carrier usage parameter status.

The reports described herein may be synthesized (e.g., aggregated). For example, FIG. 19A illustrates an example flowchart of a WTRU/UAV generating a report that includes usage parameter as described herein. As described herein, one or more reports may be synthesized/aggregated. The one or more reports may be aggregated based on applying weights to the received parameters (e.g., based on the number of received usage parameters, reference signal received power (RSRP), staleness information, frequency information, and/or the like).

One or more (e.g., multiple) CBR reports received by a WTRU/UAV may be used to estimate an actual CBR of carriers using one or more of the followings: a higher weight may be provided to $UAV_i$ from which the WTRU/UAV under consideration (e.g., $UAV_m$) has received more reports of carrier-j; equal weights, $$w_i = \frac{1}{N},$$

may be provided to one or more (e.g., all) the measurements irrespective of the UAVs/WTRUs from which the measurements are received; a higher weight may be provided to $UAV_i$ from which $UAV_m$ has received with higher received power; and/or the confidence of one or more (e.g., every) reports transmitted by a source WTRU/UAV may be provided as a part of the report.

$CBR_i^j$ may denote the CBR of carrier-j reported by $UAV_i$. $CBR_{est}^j$ may denote the estimated CBR of carrier-j by $UAV_m$ that is currently on carrier-k (k≠j).

$$CBR_{est}^j = \Sigma_i w_i (CBR_i^j) \qquad \text{Eq (1)}$$

In examples, a higher weight may be provided to $UAV_i$ from which the WTRU/UAV under consideration (e.g., $UAV_m$) has received more reports of carrier-j (e.g., as shown in FIG. 19A). Parameter N may be the total number of CBR reports received by $UAV_m$ for carrier-j in the last CBREstimationTimeInterval. Parameter $n_i$ may be the number of times that $UAV_m$ received reports from $UAV_i$ for carrier-j. Parameter $w_i$ may be $$w_i = \frac{n_i}{N}.$$

In examples, equal weights, $$w_i = \frac{1}{N},$$

may be provided to one or more (e.g., all) the measurements irrespective of the UAVs/WTRUs from which the measurements are received. The average may be calculated. The report may apply/assign the calculated average weight with equal weights to synthesize the report.

In examples, a higher weight may be provided to $UAV_i$ from which $UAV_m$ has received with higher received power (e.g., as shown in FIG. 19A). $RSRP_i$ may denote the received power from $UAV_i$, and RSRP' may denote the total sum power received by $UAV_m$ from one or more (e.g., all) WTRUs/UAVs reporting CBRs (e.g., that $UAV_m$ is interested in). Parameter $w_i$ may be $$w_i = \frac{RSRP_i}{RSRP},$$

where reference signal received power (RSRP) may be measured in milli-Watts/Watts. In examples, the WTRU/UAV report weight assignment may be proportional to RSRP of the report of that WTRU/UAV (e.g., $RSRP_i$), divided by the total RSRP of the total sum power of the WTRUs/UAVs reporting CBRs (e.g., RSRP). In examples, the weights based on RSRP described herein may be modified by a scaling factor that is specific to a WTRU/UAV or a group of WTRUs/UAVs. The weights based on RSRP may be scaled by a confidence parameter reported in the report. A time-window or timer may be associated with weights based on RSRP for a WTRU/UAV or a group of WTRUs/UAVs. The RSRP based weight assignment scaling may depend on the number of carriers on which the report is obtained, how many WTRUs/UAVs have transmitted this report, and/or the like.

In examples, the confidence of one or more (e.g., every) reports transmitted by a source WTRU/UAV may be provided as a part of the report. For example, the amount of time in frames/subframes sensed by a WTRU/UAV in generating the report may be provided as a 3-bit parameter, as described herein. The WTRU/UAV that receives the report may use the 3-bit quantized value as the weight attributed to the report and may use the 3-bit quantized value in estimating the parameter of interest.

A WTRU/UAV may transmit a report (e.g., an aggregated report as described herein). The report transmitted by a WTRU/UAV may include one or more of the following usage parameters. For example, the report may include channel busy ratio (CBR) of one of more resource pools. For example, the report may include aggregate of channel ratio (CR) for itself and one or more (e.g., all) of the vehicles that the WTRU/UAV may listen to. The WTRU/UAV may listen during a time window T that indicates the amount of resource usage for one or more resource pools. For example, a WTRU/UAV may include, e.g., in the report, the subchannels (e.g., candidate single-subframe resource (CSR) or resource pools) that the WTRU/UAV has sensed for the last N subframes (e.g., 1000 subframes) and/or the subchannels that are at least x % free (e.g., 20% free). The amount of free resources may be calculated. For example, the amount of free resources may be calculated based on at least the semi persistent reservation of resources, reselection counter (e.g., which may be randomly set between numbers, such as between 5 and 15), and/or packet transmission interval which may be indicated in the sidelink control information (SCI) transmitted by WTRUs/UAVs in a carrier. The WTRU/UAV may monitor a carrier $C_i$. The WTRU/UAV that monitors a carrier $C_i$ may read the SCI that the WTRU/UAV has access to. The WTRU/UAV may arrive at the CSR/resources that is at least x % free. The WTRU/UAV may transmit the report (e.g., the report of carrier $C_i$) in carrier $C_k$. In examples, i may equal to k. In examples, i may not be equal to k. If i=k, the transmitting and monitored carriers may be the same.

Figure 19B:
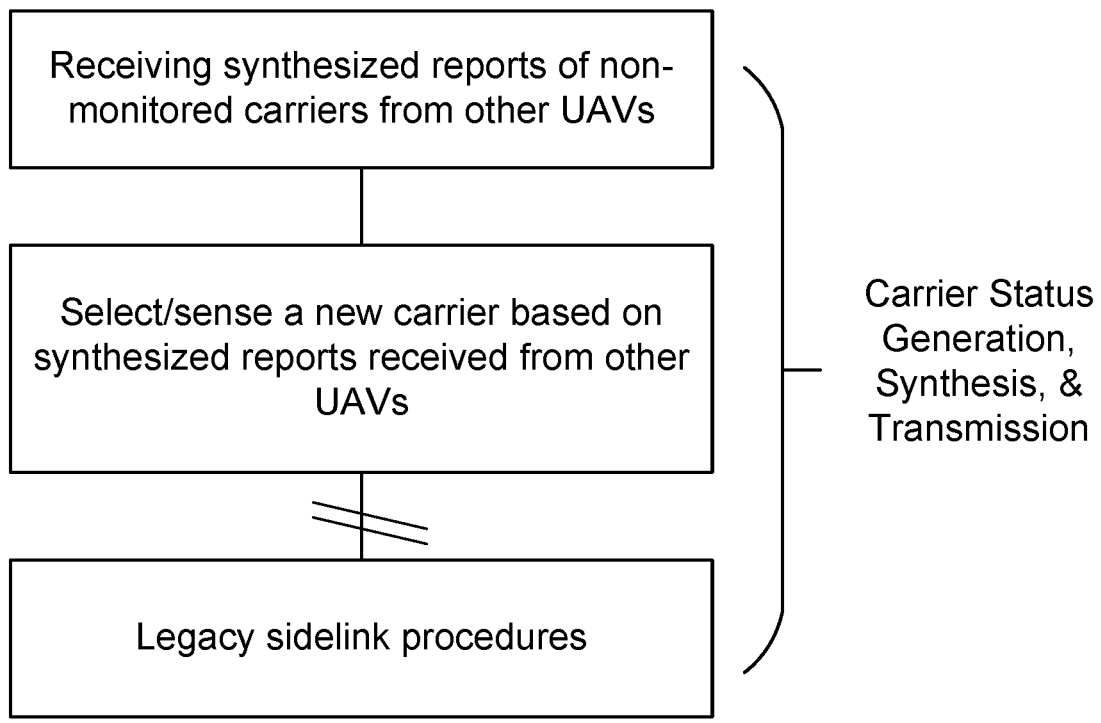
FIG. 19B illustrates an example flowchart of a WTRU/UAV performing carrier selection based on the generated carrier usage parameter status.

Based on the report, a WTRU/UAV may perform sidelink carrier selection/carrier reselection (e.g., as illustrated in FIG. 19B). For example, the WTRU/UAV may be aware of usage parameters of the carriers that the WTRU/UAV is not monitoring based on the report. The WTRU/UAV may know that the carrier that the WTRU/UAV is currently transmitting may be congested. Based on the report and/or the usage parameters of other carriers, the WTRU/UAV may know one or more other carriers that have less congestions than the carrier that the WTRU/UAV is currently connected to. The WTRU/UAV may perform sidelink carrier selection/reselection to other carrier with less congestions, less usage, and/or the like based on the report and/or the usage parameters as described here and illustrated in FIG. 19B.

A network (e.g., eNB, gNB, and/or the like) may signal carrier selection related information. For example, a network may signal the minimum requirements for the UAVs/WTRUs to select a carrier that includes one or more of the followings: minimum of $n_1$ reports to have obtained from at least $n_2$ UAVs/WTRUs for a time period of at least T seconds; and/or a total of n reports (e.g., for a carrier to which the WTRU/UAV intends to perform the carrier selection) in its coverage area, e.g., in the last T seconds of which at least x % are received with a power level greater than a threshold, THR.

A WTRU/UAV may have a preference(s) in performing carrier selection to one or more (e.g., multiple) carriers as allowed by the service. The WTRU/UAV may not have adequate knowledge on one or more (e.g., all) carriers that the WTRU/UAV has the preference(s), e.g., due to not receiving status reports on some set of carriers, because there were not enough WTRUs/UAVs to report status on those carriers. The WTRU/UAV may choose a carrier that the WTRU/UAV has knowledge about and/or that meets the minimum criterion (e.g., as described herein), and/or provided the carrier selection criterion (e.g., channel occupancy ratio satisfying a condition) may be satisfied for that carrier from the perspective of the WTRU/UAV.

A network may aid carrier selection. For example, a network (e.g., eNB, gNB, etc.) may provide one or more inputs on carrier selection. The network may provide one or more inputs on carrier selection based on the congestion that the network infers. The network may infer congestions through the CBR measurements reported by the WTRUs/UAVs (e.g., as described herein and/or as illustrated in FIG. 19A) and/or through its own measurements. A network aided carrier selection may be applicable for Mode-3 operations.

Figure 5:
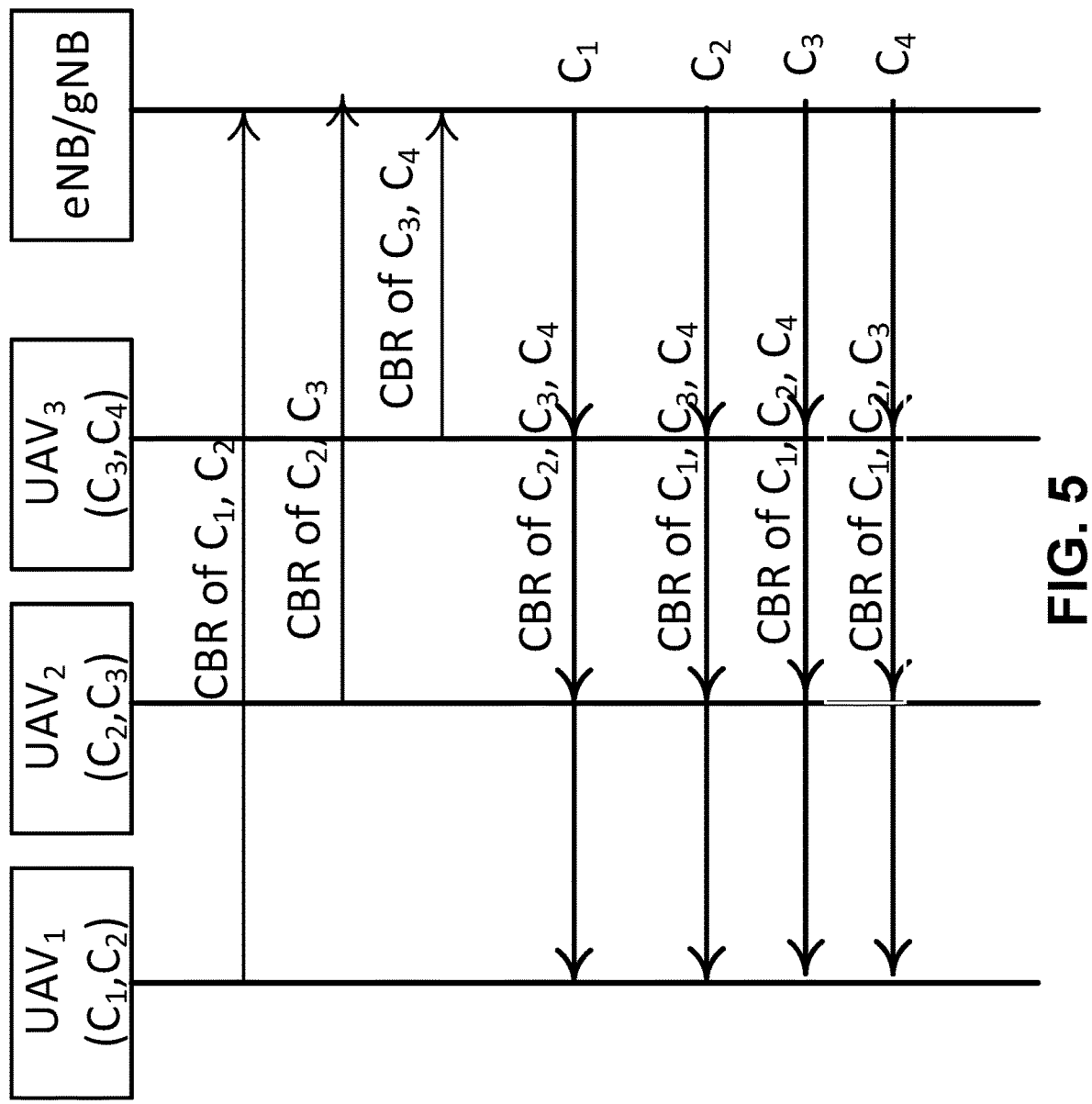
FIG. 5 illustrates an example network aided carrier selection/carrier reselection.

WTRUs/UAVs may report (e.g., may first report) absolute CBRs or CBR statistics of the monitored and/or transmitting carrier to the eNB or the gNB. The absolute CBRs may be the CBRs of the carriers that the WTRU/UAV has tuned to (e.g., those carriers that the WTRU/UAV is monitoring and/or transmitting on). The network (e.g., the gNB) may perform the cross-carrier CBR aggregation role. For example, the WTRUs/UAVs may not perform the cross-carrier reporting that the WTRUs/UAVs do not monitor. Based on the measurements reported by one or more WTRUs/UAVs on different carriers, the network (e.g., the eNB, the gNB, or etc.) may aggregate the measurements and may send the measurement back in the appropriate carriers to WTRUs/UAVs that may be affected. FIG. 5 illustrates an example network aided carrier selection/carrier reselection.

As shown in FIG. 5, a UAV may tuned to carriers $C_1$, $C_2$ and may transmit the CBR of $C_1$, $C_2$. A $UAV_2$ may tune to carriers $C_2$, $C_3$ and may transmit the CBR of $C_2$, $C_3$, and so forth. The UAVs described herein may be examples of WTRUs, and may be used interchangeably. The network, such as the eNB, may aggregate or synthesize usage parameters, such as the CBR statistics as described herein. For example, the network, such as the eNB or the gNB, may use an algorithm to aggregate/synthesize the CBR statistics (e.g., similar as described herein). The network (e.g., the eNB, gNB, etc.) may transmit the CBR statistics of carriers $C_2$, $C_3$, $C_4$ in carrier $C_1$. The network may transmit the CBR statistics of carriers $C_1$, $C_3$, $C_4$ in carrier $C_2$. The network may transmit the CBR statistics of carriers $C_1$, $C_2$, $C_4$ in carrier $C_3$. The network may transmit the CBR statistics of carriers $C_1$, $C_2$, $C_3$ in carrier $C_4$. For example, the network may transmit the CBR statistics and/or other usage parameters of carriers to other carriers in a report.

A WTRU/UAV may be aware of CBRs of the carriers by sensing. A WTRU/UAV tuned to carriers $\{C_i\}$ may receive the usage parameters, such as CBR statistics, of carriers $\{C_k\}$, (k≠i) from the eNB. A WTRU/UAV may select an appropriate carrier. For example, the WTRU/UAV may select a carrier that has the least CBR based on the received CBR statistics of the carriers.

Figure 6:
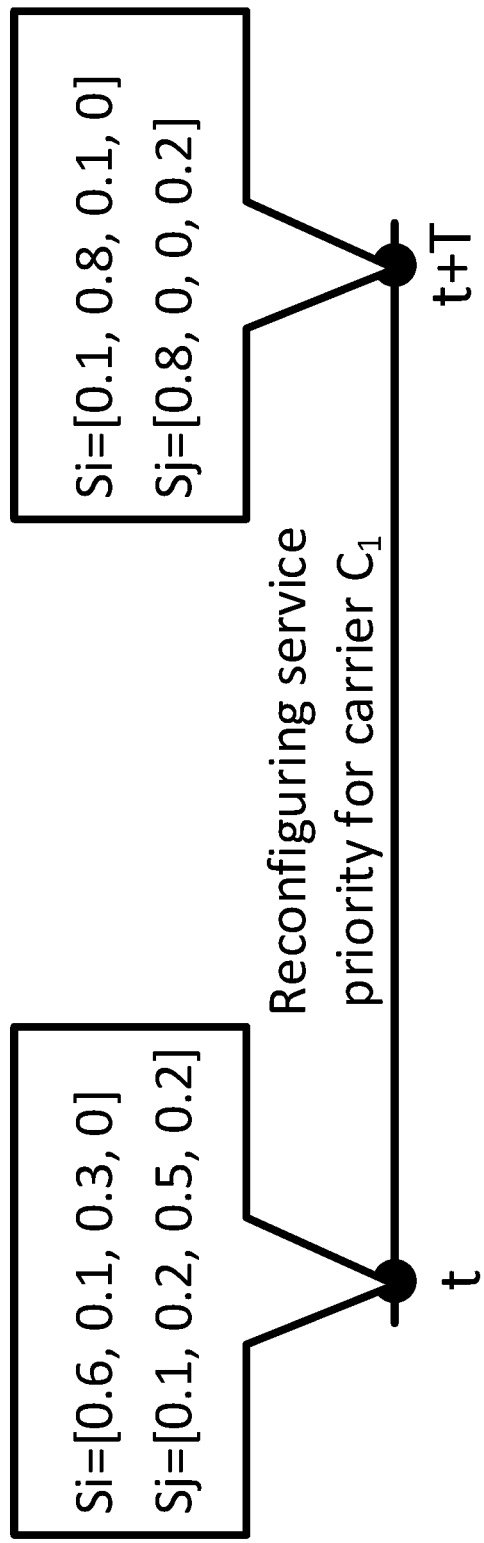
FIG. 6 illustrates an example reconfiguration service priority for carrier C1 from $S_i$ to $S_j$.

In examples, the network may provide weights associated to a (e.g., each) carrier for a service (e.g., instead of and/or in addition to transmitting CBR statistics as described herein) and may aid the WTRUs/UAVs in carrier selection/carrier reselection. The network (e.g., the eNB, the gNB, or etc.) may consider the CBRs of carriers as one of the parameters into arriving at the weights associated per carrier and/or per service. A service $S_i$ may be allowed in carriers $\{C_1, C_2, C_3, C_4\}$, and service $S_j$ may be allowed in carriers $\{C_1, C_4, C_7\}$. The eNB may configure weights for services $S_i=\{x_1, x_2, x_3, x_4\}$ and $S_j=\{y_1, y_2, y_3\}$, where $0 \leq x_i, y_i \leq 1$. The weight for a particular carrier for a service may indicate the preference levels that a WTRU/UAV may use to access the carrier. For example, $S_i=[0.1\ 0.2\ 0.3\ 0.4]$, $S_j=[0.04\ 0.6\ 0.36]$ may indicate that when a WTRU/UAV wants to use service $S_j$, the WTRU/UAV may want to reselect to carrier $C_4$ (e.g., the carrier with high weights) first than any other carrier. The assignments of weights described herein may indicate that a WTRU/UAV may want to prefer carrier $C_1$ for service $S_i$ than service $S_j$. The network may transmit the CBR and/or parameters, such as weights. For example, the network (e.g., the eNB, the gNB, etc.) may transmit the CBR and/or weight related parameters periodically with a preconfigured time period. FIG. 6 illustrates an example reconfiguration service priority for carrier $C_1$ from $S_i$ to $S_j$. For example, the network (e.g., the eNB, the gNB, etc.) may reconfigure the service priority for carrier $C_1$ from service $S_i$ (e.g., at time t) to service $S_j$ (e.g., at time t+T). The carrier access priority for service S may change from carrier $C_1$ to $C_2$ based on the reconfiguration shown in FIG. 6.

Contents of a WTRU/UAV may report to a network, such as an eNB or a gNB, and the network may report to WTRUs/UAVs.

As shown in FIG. 5, CBR reported to the network, such as the eNB or the gNB, by one or more WTRUs/UAVs may be refer to a status report. The status report may include one or more parameters.

The status report may include CBR. The status report may include COR. The WTRU/UAV may calculate the CBR and/or COR included in the status report based on the contents of SCI. For example, the contents of the SCI may include the reselection counter, packet transmission interval, transmission resource pattern index (TRPI), and/or the like.

The network may take into account the status reported by a (e.g., each) WTRU/UAV and/or may send an aggregated report to one or more (e.g., all) WTRUs/UAVs or subset of the WTRUs/UAVs. The aggregated report may include one or more of the following parameters. The aggregated report may include CBR of one or more resource pools. The aggregated report may include resource pools or candidate resources. The report may include CSR that is at least x % free. The report may include carrier prioritization weights for one or more services as described herein (e.g., see also FIG. 6). The report may include carrier prioritization weights for one or more services based on UAV/WTRU capability. The eNB may be reconfigured and may not allow one or more carriers for a service by assigning zero weights to those carriers.

CBR of monitored carriers may be reported in a distributed framework.

A WTRU/UAV may choose a number (e.g., a random number) in a pre-configured contention window, and based on the class and/or priority of the mission and/or the chosen number (e.g., the chosen random number), the WTRU/UAV may transmit the relevant CBRs of one or more (e.g., all) the monitored carriers or a subset of the monitored carriers on the transmitting carrier.

A WTRU/UAV may transmit the CBR statistics of a first subset of its monitored carrier(s) in its first transmission opportunity in the transmitting carrier and may transmit a second subset of its monitored carrier(s) in its second transmission opportunity in the transmitting carrier. The second subset may include one or more carriers (e.g., new carriers) that may not be included in the first subset.

A WTRU/UAV may transmit the CBR statistics of one or more (e.g., all) monitored carriers or a subset of the monitored carriers. For example, a WTRU/UAV may transmit the CBR statistics periodically. The time period of transmission may be based on the WTRU/UAV class and/or priority of the mission.

A WTRU/UAV may determine what measurement(s) to receive. A WTRU/UAV may determine how to process the received measurement(s). A WTRU/UAV may perform carrier selection in a distributed framework.

A WTRU/UAV may be tuned to a set of carrier(s) $\{A_i\}$, receiving the CBR of one or more (e.g., all) (e.g., or a subset) of other carriers $\{B_i\}$, where $\{B_i\}$ may be different from the carrier(s) $\{A_i\}$ that the WTRU/UAV is tuned to. The WTRU/UAV may use the received CBRs to select one or more of the carriers in $\{B_i\}$.

In examples, a WTRU/UAV may estimate usage parameters, such as the CBR, of a carrier that the WTRU/UAV is not tuned to. A WTRU/UAV may estimate the usage parameters, such as the CBR, of a carrier that the WTRU/UAV is not tuned to based on the synthesizing the CBR information (e.g., distributed CBR information) of monitored carriers obtained from other WTRUs/UAVs in its geographical vicinity and/or on a weighted criterion. The weight to a particular CBR measurement may be based on the fraction of times the CBR is received from a particular WTRU/UAV.

In examples, a WTRU/UAV may estimate usage parameters, such as the CBR, of a carrier that the WTRU/UAV is not tuned to. For example, a WTRU/UAV may estimate usage parameters, such as the CBR of a carrier that the WTRU/UAV is not tuned to based on a weighted criterion. The weight associated to a particular CBR measurement may be proportional to the ratio of its received signal strength to the total received power of one or more (e.g., all) CBRs including the CBR statistics of monitored carriers obtained from other WTRUs/UAVs.

A WTRU/UAV may determine what measurement(s) to receive and/or may determine what methodology to perform carrier selection in a network-aided framework.

A WTRU/UAV may transmit usage parameters, such as CBRs, of one or more (e.g., all) monitored and/or transmitting carriers to a network, such as an eNB or a gNB. The network may aggregate the usage parameter statistics, such as the CBR statistics, from other WTRUs/UAVs. The network may transmit in a carrier $C_i$ and/or the CBR statistics information of one or more (e.g., all) other carriers $\{C_k\}$, where $k \neq i$.

A WTRU/UAV may be tuned to a carrier $C_i$, receiving usage parameter statistics, such as the CBR statistics, of one or more (e.g., all) other carriers $\{C_k\}$, where $k \neq i$. The received CBR statistics may be used to perform carrier selection. The WTRU/UAV may select (e.g., attempt to select) a carrier (e.g., a first carrier) that the WTRU/UAV estimates to have the least CBR. The WTRU/UAV may select (e.g., attempt to select) other carrier (e.g., a second carrier) that the WTRU/UAV estimates to have the next least CBR.

A WTRU/UAV may receive service specific weights associated to carriers from a network, such as an eNB. The WTRUs/UAVs may select a carrier (e.g., a first carrier) that has high weight (e.g., the highest weight) for the service desired by a WTRU/UAV. If the selected carrier (e.g., the first selected carrier) is not suitable, the WTRU/UAV may select other carrier (e.g., a second carrier) with the next high weight (e.g., the next highest weight), and so forth.

A WTRU/UAV may receive reconfiguration of service specific carrier weights. The WTRUs/UAVs may use the updated service specific carrier weights to select carriers. For example, the WTRUs/UAVs may use select carriers in the decreasing order of carrier weights.

Congestion may be minimized and/or energy efficient enhanced reliability for carrier aggregation may be enabled for one or more WTRUs/UAVs.

MAC/PHY layer may be configured to transmit adaptation during PDCP packet duplication.

PDCP duplication may enhance the reliability of packets, e.g., without considering the detrimental effects of CBR.

Figure 7:
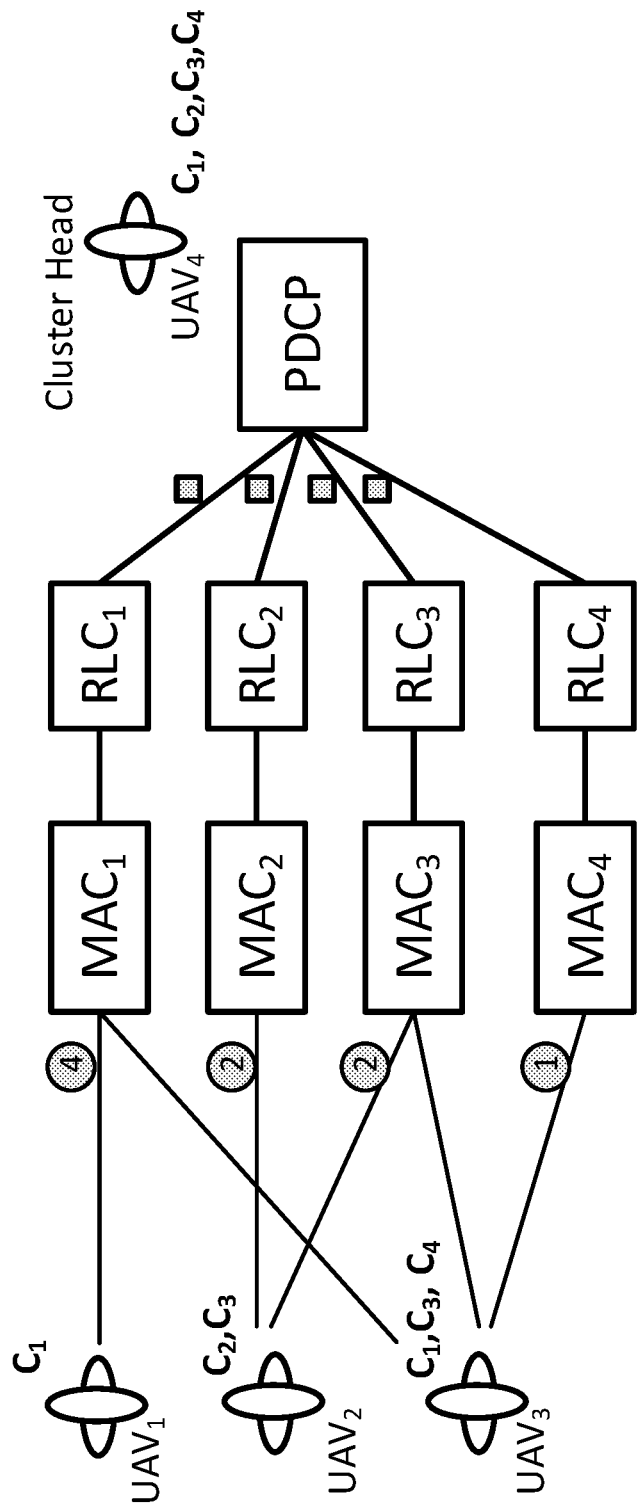
FIG. 7 illustrates an example MAC/PHY transmission adaptation during packet data convergence protocol (PDCP) packet duplication.

FIG. 7 illustrates an example MAC/PHY transmission adaptation during PDCP packet duplication. As shown in FIG. 7, four WTRUs/UAVs (e.g., numbered $UAV_1$ through $UAV_4$) may participate in resolution advisory (RA) phase. The WTRUs/UAVs, shown in FIG. 7, may have different capabilities in the number of transmit/receive chains that the WTRUs/UAVs possess and/or may have different frequencies that the WTRUs/UAVs have tuned to. For example, $UAV_1$ may support and/or may be tuned to $C_1$. $UAV_2$ may support and/or may be tuned to $C_2$, $C_3$, and so forth. The cluster head $UAV_4$ may intend to provide a RA to one or more (e.g., all) members in a group and/or may be aware of the carrier capabilities of one or more (e.g., every) members in the group. The cluster head may duplicate a PDCP packet (e.g., once for each carrier) and/or may provide the PDCP packet to the respective MAC. A separate MAC/RLC entity may exist for one or more (e.g., every) carriers handled by the cluster head. The cluster head (e.g., $UAV_4$) may disseminate the RA phase information to its members. For example, the cluster head, such as the $UAV_4$, may transmit the transport blocks (TBs) corresponding to a (e.g., each) MAC/carrier, the default number of times (e.g., four times) as in the current systems. Transmitting the TBs corresponding to each MAC as described herein may not consider the capability of the receivers and may result in a blind transmission and/or an increase in congestion. In examples, duplication across the carriers may be allowed. In examples, duplication within a carrier may not be allowed. For WTRUs/UAVs that support a carrier, the reliability levels of four transmissions per TB may be all that the WTRUs/UAVs may be able to get.

As described herein, the carrier aggregation capability of the receivers may be considered to adapt the number of transmissions per carrier. For example, the $UAV_1$ shown in FIG. 7 may support (e.g., support only) $C_1$, and four transmissions of TB may be supported on that carrier to maintain the required level of reliability. The $UAV_2$ may support carriers $C_2$ and $C_3$ (e.g., which the cluster head may also support), and the cluster head may distribute (e.g., evenly distribute) the number of transmission per carrier in $C_2$ and $C_3$. During the PDCP duplication phase, the MAC for carriers $C_2$, $C_3$ may transmit (e.g., may each transmit) the transport blocks twice (e.g., instead of or in addition to four times). In examples, the cluster head may adapt the transmission on $C_2$, $C_3$ based on the congestion levels (e.g., CBRs) experienced. For example, if the $C_2$ is more congested than the $C_3$, $MAC_2$ may transmit once (e.g., only once) in the $C_2$, while $MAC_3$ may transmit three times in the $C_3$. The number of transmissions in carriers $C_1$, $C_2$, $C_3$ may be determined based on the capability of $UAV_1$ and $UAV_2$. For carrier $C_4$, which may be supported (e.g., supported only) by the $UAV_3$ (e.g., and/or the cluster head), the number of transmissions that the cluster head needs to provide in the $C_4$ may be determined based on the number of transmissions that have been provisioned on the other carriers supported by the $UAV_3$ (e.g., in $C_1, C_3$). As shown in FIG. 7, the $UAV_3$ may receive (e.g., already receive) 4 transmissions from $C_1$ and 2 transmissions from the $C_3$. No additional transmission may be (e.g., may need to be) transmitted in the $C_4$ (e.g., assuming that a total of 4 transmissions across one or more (e.g., all) carriers put together). As shown in FIG. 7 and as an example, the $UAV_3$ may receive an additional transmission transmitted in the $C_4$. Based on the carrier aggregation capability of the receivers, the number of transmissions at one or more (e.g., every) carriers may be optimized. For example, the number of transmissions at one or more (e.g., every) carriers may be optimized jointly across the carriers. A service may be provided in carriers $\{C_i\}$ in a sub-geographic area. If a certain subset of carrier(s) $\{C_j\}$, where $\{C_j\} \subset \{C_i\}$, is determine that the subset of carrier(s) $\{C_j\}$ is not used due to capability of the WTRUs/UAVs, a WTRU/UAV that is capable of transmitting in $\{C_j\}$ may not perform PDCP duplication in the carriers $\{C_j\}$.

The transmitter described herein may be assumed to know that the aggregation capability of the receivers may adapt the number of transmissions in the individual carriers.

Carrier aggregation enabled WTRUs/UAVs may use energy efficient distributed (e.g., Mode-4) transmission.

WTRUs/UAVs may exchange carrier aggregation capability information. The WTRUs/UAVs may infer and/or determine the aggregated capability information of one or more (e.g., all) other WTRUs/UAVs in the coverage area. The aggregated capability information may enable the source WTRU/UAV to constrain its transmission of a service to the carriers that are supported and/or tuned to/by the other WTRUs/UAVs. The source WTRU/UAV may be capable of transmitting in a greater number of carriers. For example, the source WTRU/UAV may transmit in a greater number of carriers than its intended target WTRUs/UAVs. Based on the inferred and/or determined carrier capability information, a carrier may adapt the number of transmissions performed per carrier, as described herein.

One or more of the following parameters may be exchanged to indicate the capability. Carrier capability information may be exchanged to indicate the capability. Relay capability information may be exchanged to indicate the capability. Time to live information may be exchanged to indicate the capability.

Carrier capability information may include an explicit absolute radio frequency channel number (ARFCN) and/or bit-packed index of preconfigured list of E-UTRA ARFCNs (EARFCNs) (e.g., with a one-to-one map between the EARFCN and the index) of the carriers that the UAV/WTRU is capable of and/or is currently tuned to.

Relay capability information may include an explicit ARFCNs and/or index of preconfigured list of EARFCNs of the carriers that the UAV/WTRU is capable of providing relay services.

Time to live (TTL) information may indicate the number of hops to which a UAV/WTRU may forward the message. For example, if the capability of the received message is different from its capability, the TTL information may indicate the number of hops to which a UAV/WTRTU may forward the message. The WTRU/UAV may forward new information. For example, as the WTRU/UAV would have transmitted its capability information, the WTRU/UAV may forward the new information.

A WTRU may be configured to utilize L2 signaling (e.g., MAC signaling) to exchange the information described herein. For example, a MAC control element (MAC-CE), that defines the carrier aggregation capability of the UAV, may be transmitted as a part of MAC PDU. MAC-CE of type carrier aggregation capability or EARFCN may be defined. For example, the MAC-CE of type carrier aggregation capability or EARFCN may define the bands and/or carrier aggregation capability of a device described herein.

Index EARFCN
[0]1234→Band 1/Channel 2
[1]2345→Band 2/Channel 3
[2]3456→Band 2/Channel 4
[3]4567→Band 3/Channel 1

Figure 8:
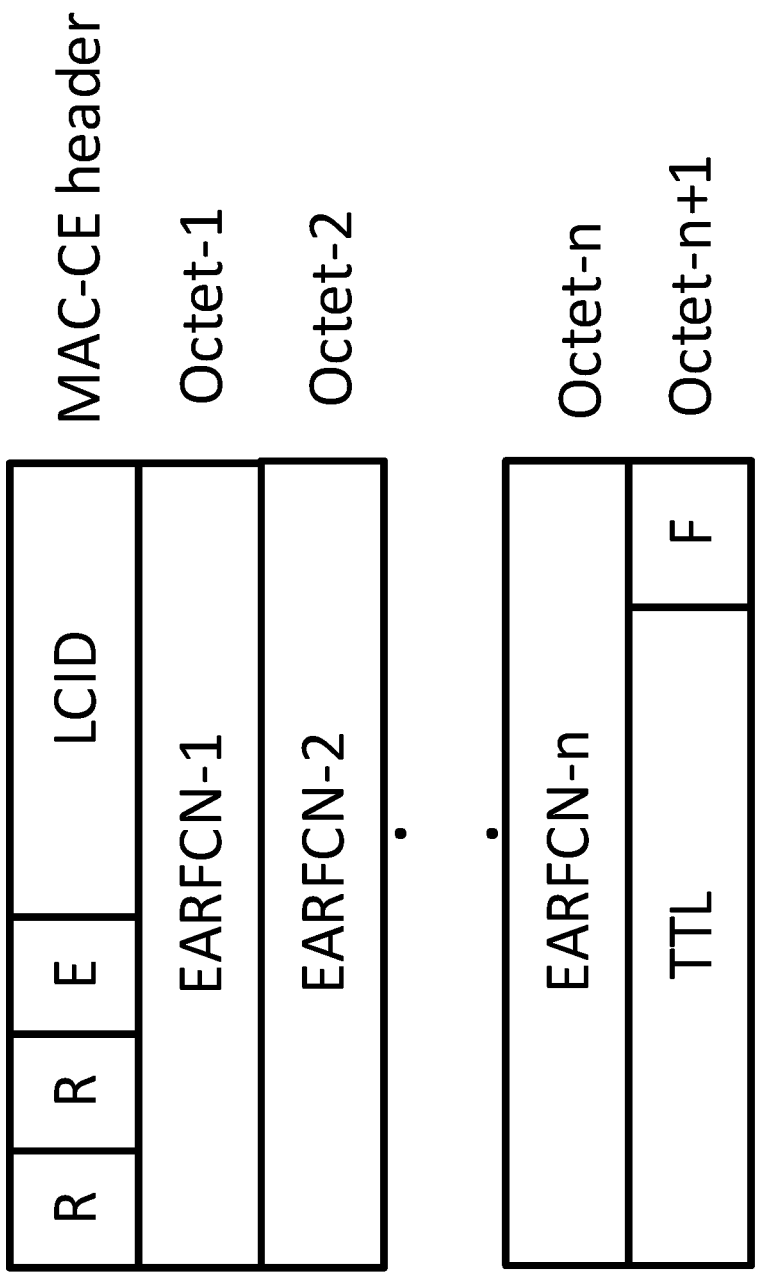
FIG. 8 illustrates an example carrier aggregation MAC-CE structure for sidelink.

FIG. 8 illustrates an example carrier aggregation MAC-CE structure for sidelink.

As shown in FIG. 8, logical channel ID (LCID)=0x0011 in the MAC-CE header may identify that it is a carrier aggregation CE. TTL may denote a time to live flag. Parameter F may denote a forward flag. TTL and/or F flag (e.g., as described herein and/or FIG. 8) may be broadcasted in a sidelink and/or may have a destination MAC address set to the broadcast address.

In FIG. 8, the parameter ERAFCN-i may indicate an absolute and/or an indexed EARFCN as described herein. A subset of EARFCNs shown in FIG. 8, for example m EARFCNs (e.g., where m<n), may indicate the relaying capabilities.

A WTRU may be configured to utilize RRC signaling to exchange the information described herein. For example, an RRC level message may be sent and may include RRC carrier aggregation capability. The RRC message may be broadcasted in a sidelink. The RRC level message may have the EARFCN information as described herein. The RRC level message may include the TTL/F field/messages, e.g., similar to FIG. 8.

For example, the protocol for inferring the carrier aggregation capability and/or Tx, Rx tuning information may proceed according to one or more of the followings. The carrier aggregation capability may be indicated. A WTRU (e.g., a $UAV_1$) may receive carrier capability (CARRCAP) from other WTRUs (e.g., a $UAV_2$).

The carrier aggregation capability may be indicated as described herein (e.g., L2/RRC signaling). The capability information packet/PDU/SDU/MAC-CE transmitted by a WTRU/UAV may be denoted to be CARRCAP. The CARRCAP may indicate one or more carriers supported by a WTRU/UAV.

For example, the $UAV_1$ may receive the CARRCAP from the $UAV_2$. If the carrier aggregation capability of the $UAV_2$ is different from that of the $UAV_1$ and if the TTL count of the received CARRCAP message is greater than zero, the UAV may re-broadcast the CARRCAP. The TTL count (e.g., as depicted in FIG. 8) may denote a number of hops (e.g., a maximum number of hops) that the message may be forwarded. An example implementation, such as an algorithm implementation, may include one or more of the following procedures shown in Table 2. The numbers shown in Table 2 may present for purposes of references. As such, the numbered actions may be performed in a different order (e.g., in whole or in part) that as shown in Table 2.

TABLE 2

| Example implementation |
| --- |
| 1): May receive CARRCAP from a neighbor. |
| 2): May set TTL to TTL: =TTL-1 |

TABLE 2-continued

Example implementation

3): If the carrier aggregation capability of received CARRCAP is different from its own,
3-a) May set Forward Flag = 1
For example, for downstream WTRUs/UAVs to be aware that this is a forwarded message
3-b) May re-broadcast CARRCAP
4): If the carrier aggregation capability of received $PIBS_D$ is the same as its own,
4-a) May discard the received CARRCAP message.
For example, the self-UAV may have transmitted $PIBS_D$, which includes the same information.

One or more (e.g., all) WTRUs/UAVs in a geographical region may exchange MAC-CE and/or RRC level carrier aggregation information. Using the TTL field, received CARRCAP, and/or its own carrier aggregation capability, a WTRU/UAV may re-broadcast one or more of the received information. At a steady state, one or more (e.g., every) WTRUs/UAVs in a sub-geographic area may be aware of the each other's capability.

Transmitting capability information may be configured.

A network, such as an eNB or a gNB, may signal a time period T (e.g., or the subframe/SFN number that satisfies a criterion, such as TTI mod 3==0) for the WTRUs/UAVs to transmit the capability information periodically. In examples, the transmission of capability information may be based on the CBR experienced. The CBR ranges and/or the corresponding time period (e.g., when WTRUs/UAVs should transmit the capability information) may be signaled by the eNB. The signaled information (e.g., the CBR ranges and/or the corresponding time period) may be pre-configured for the WTRUs/UAVs that operate in out of coverage scenarios.

Resource may be configured for carrier capability reporting.

A resource(s) may be pre-configured. For example, a resource(s) may be pre-configured for out of coverage scenarios. A resource(s) may be pre-configured, where WTRUs/UAVs transmit capability information. Resource allocation for transmission of capability information may be specified by a network, such as an eNB, a gNB, etc., through system information messages, RRC, MAC-CE, and/or the like, when the WTRUs/UAVs are under coverage. In examples, the network, such as the eNB or the gNB, may provide a resource pool that may be common to one or more (e.g., all) WTRUs in a cell, and the WTRUs may determine and/or infer (e.g., implicitly determine and/or infer) the resource where the resource needs to be transmitting the capability information. For example, the WTRUs may determine and/or infer where the resource needs to be transmitting the capability information based on parameters, such as the WTRU-ID (e.g., IMSI), geographical coordinates, and/or the like. The network, such as the eNB or the gNB, may signal the starting resource and/or resource element (e.g., start_resource) that may be common to one or more (e.g., all) the WTRUs/UAVs in the cell, and a (e.g., each) UAV/WTRU may determine appropriate resource for transmission based on the following:

Resources used by $UAV_i$ for transmitting the capability information=$(IMSI_i + \text{start\_resource})$ mod (number of PRBs)+geography_id A network may aid transmission to be an energy efficient transmission for carrier aggregation enabled WTRUs/UAVs.

A network, such as an eNB or a gNB, may be aware of the services used by one or more (e.g., all) WTRUs/UAVs, Tx/Rx capabilities, and/or subscription related information. For example, at the time of connection establishment, a WTRU/UAV may provide its capability information to the network, such as the eNB or the gNB. The network may be aware of the position of the WTRUs/UAVs. The network may determine and/or infer (e.g., precisely determine and/or infer) the statistics of the carrier usage information in a particular sub-geographical area, e.g., based on the position of the WTRUs/UAVs. For example, the network may provide assistance information on the carrier aggregation capability (e.g., or the carriers to which mobiles have tuned into) of the WTRUs/UAVs based on sub-geographic areas within the cell. The assistance information may enable the WTRUs/UAVs in a sub-geographic area to constrain its transmission of a service to (e.g., only to) the carriers that are supported in its sub-geographic areas (e.g., and possibly adjoining areas). The source WTRU/UAV may be capable of transmitting in more number of carriers. Based on the signaled carrier capability, the number of transmissions per carrier may be adapted, as described herein.

Figure 9:
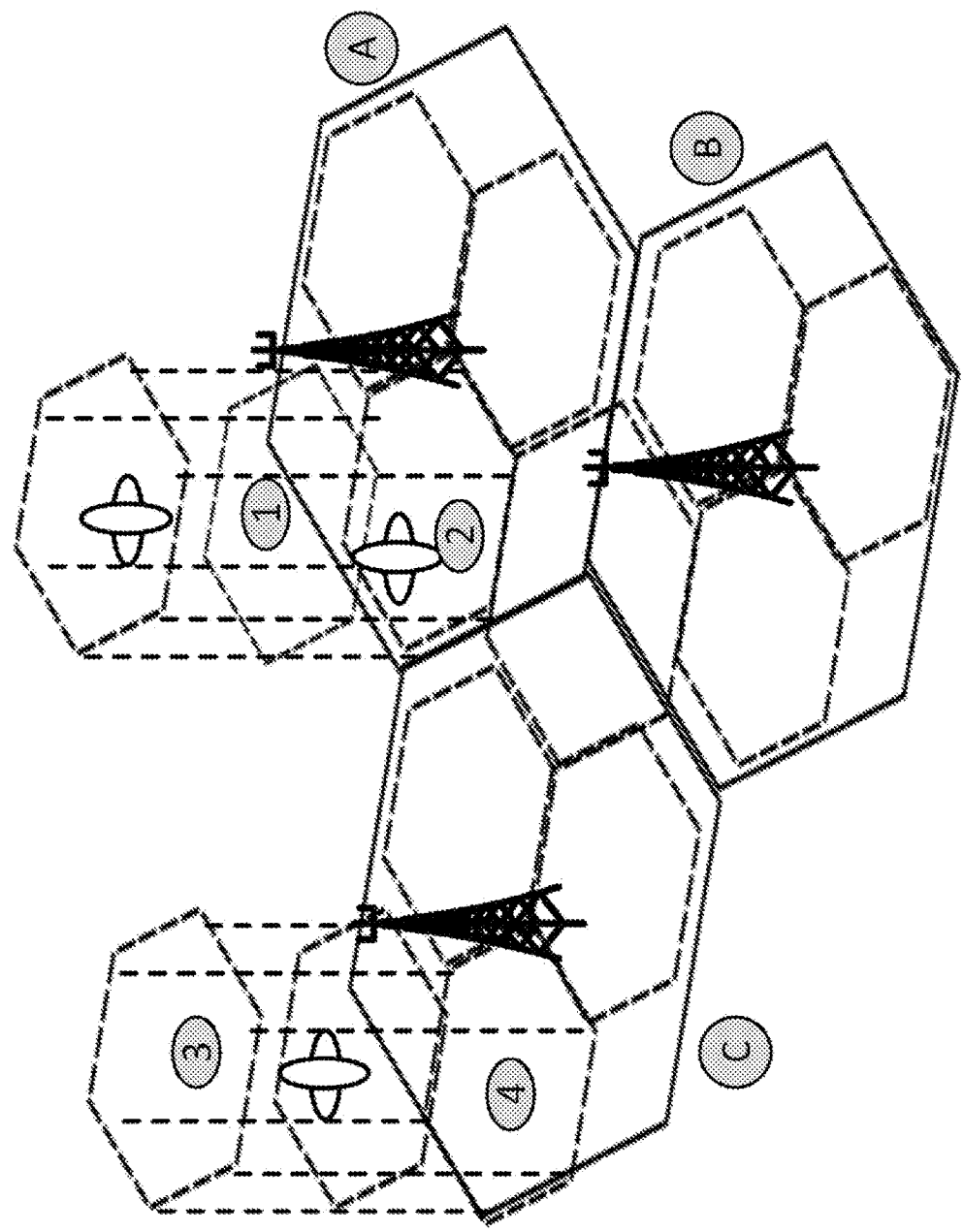
FIG. 9 illustrates an example geography based signaling of carrier capacity and/or Tx/Rx tuning information by a network.

FIG. 9 illustrates an example geography based signaling of carrier capacity and/or Tx/Rx tuning information by a network. For example, three cells A, B, and C may exist, e.g., as shown in FIG. 9. The three cells may be divided into fixed 3-d sub-geographic regions, numbered from 1 through 4 (e.g., not all 3-d regions are shown in FIG. 9).

$V_i$ may denote the carrier capability information of one or more (e.g., all) WTRUs/UAVs in sub-geographic region-i (i=1,2, . . . ). f ($UAV_k^i$) may denote the capability information of $UAV_k$ in sub-geographic region-i. The aggregated capability information of one or more (e.g., all) WTRUs/UAVs in sub-geographic region-i may be:

$$V_i = \cup_k f(UAV_k^i) \qquad \text{Eq (2)}$$

The network may broadcast $V_i$ in sub-geographic region-i. For example, the eNB may broadcast $V_i$ in sub-geographic region-i, using a sub-geographic region specific group radio network identifier (GRNTI). The sub-geographic region specific GRNTI may provide a one-to-one mapping between the sub-geographic location and GRNTI. The sub-geographic region specific GRNI of one or more (e.g., all) regions may be broadcasted in SIBs. The WTRUs/UAVs may choose (e.g., autonomously choose) the appropriate GRNTI when the WTRUs/UAVs move from a sub-geographic region-1 to a sub-geographic region-2.

The WTRUs/UAVs that are in sub-geographic region-i and not close to adjoining sub geographic regions (e.g., which the WTRUs/UAVs may be aware of from their GPS location) may use (e.g., use only) $V_i$ to adapt the transmissions. The WTRUs/UAVs that are in sub-geographic region-i and is close to one or more (e.g., multiple) adjoining regions may use $\{V_{i-1}, V_i, V_{i+1}\}$ or more carrier capability information of the WTRUs/UAVs (e.g., depending on the location) to adapt their transmissions. For the sub-geographic regions that are close to cell edges and/or that overlap into regions controlled by one or more (e.g., multiple) networks, the networks (e.g., the eNBs, the gNBs, etc.) may exchange the capability information of WTRUs/UAVs.

For example, the network, such as the eNBs or gNBs, may exchange the capability information of WTRUs/UAVs through X2 interface using which $\{V_i\}$ may be updated.

A WTRU/UAV may determine how to adapt MAC/PHY retransmissions per carrier during PDCP duplication.

A WTRU/UAV may adapt a number of transmission(s) (e.g., and/or (re)transmission(s)) per carrier at the MAC/PHY layer during the PDCP duplication phase. For example, a WTRU/UAV may adapt a number of re/transmissions per carrier at the MAC/PHY layer during the PDCP duplication phase based on the carrier aggregation capability and/or Tx/Rx tuning information of one or more (e.g., all) receivers in its geographical vicinity. The number of re/transmission(s) at one or more (e.g., every) carriers may be based on optimizing (e.g., jointly optimizing) across one or more (e.g., all) carriers such that the desired level of reliability (e.g., aggregated over the number of carriers supported by a receiver) may be maintained at one or more (e.g., every) receivers, while minimizing the number of transmission(s) (e.g., and/or retransmission(s)) per carrier to limit the CBR.

A WTRU/UAV may determine how to obtain carrier aggregation capability in a distributed framework.

The carrier aggregation capability and/or Tx/Rx tuning information of the WTRUs/UAVs in a region may be obtained in a distributed framework. One or more (e.g., every) WTRUs/UAVs may broadcast the carrier aggregation capability, e.g., via application layer using MAC-CE or RRC layer signaling as described herein.

A $UAV_1$ may broadcast its capability information in a sidelink. For example, the $UAV_1$ may broadcast its capability information in the sidelink after preconfiguring a value of TTL field based on the current speed (e.g., and/or anticipated average speed in a time window), estimated density of WTRUs/UAVs in its vicinity, and/or the like. A $UAV_2$ may receive the capability information from the $UAV_1$. The $UAV_2$ may decide to re-broadcast the received capability information from the $UAV_1$ or not to re-broadcast the received capability information from the $UAV_1$. For example, the $UAV_2$ may determine whether re-broadcast the received capability information from the $UAV_1$ based on the current value of the TTL field and/or whether the capability of the $UAV_1$ is different from that of the $UAV_2$. The $UAV_2$ may modify the TTL field and/or rebroadcast the TTL field if the capability of the $UAV_1$ is different from the $UAV_2$. If the capability of the $UAV_1$ is same as the $UAV_2$, the message may be discarded and/or may not be forwarded.

A WTRU/UAV may determine how to obtain carrier aggregation capability in a network-aided framework.

The carrier aggregation capability and/or Tx/Rx tuning information may be obtained from a network (e.g., an eNB, a gNB, etc.). The network may provide the aggregated capability information of WTRUs/UAVs. For example, the network may provide the aggregated capability information of WTRUs/UAVs based on per geographical region basis through a system information message.

A mapping between the GRNTI and the sub-geographical region may be signaled. For example, the mapping between the GRNTI and the sub-geographical region may be signaled with a fixed time period. The mapping between the GRNTI and the sub-geographical region may be signaled if mapping is changed (e.g., changed dynamically).

A $UAV_1$, in a sub-geographical region-1, may use an appropriate GRNTI to receive the aggregated capability information of region-1 and/or may use the information to adapt the transmissions.

A $UAV_2$, in sub-geographical region-2 but close to the region-1, may receive the GRNTIs of one or more regions (e.g., regions-1, 2, 3, and/or 4). The $UAV_2$ may use the aggregated capability information to adapt the transmissions.

A WTRU may be configured to act as a relay using carrier aggregation for sidelinks and/or to communicate with another WTRU that is acting as a relay using sidelink carrier aggregation. For example, service and/or carrier forwarding may be provided by a relay.

Figure 10:
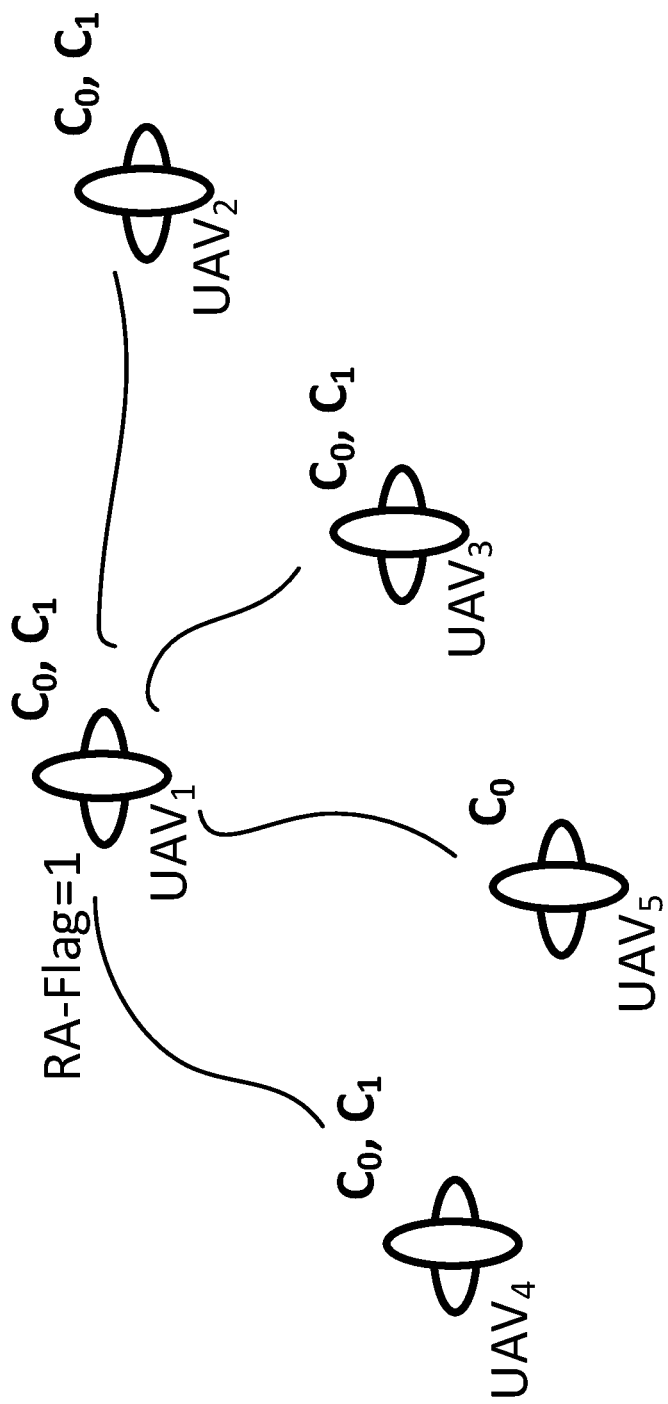
FIG. 10 illustrates an example carrier forwarding for WTRUs/UAVs with different capabilities.

FIG. 10 illustrates an example carrier forwarding for WTRUs/UAVs with different capabilities. As shown in FIG. 10, five WTRUs/UAVs (e.g., numbered $UAV_1$ through $UAV_5$) may have different capabilities. One or more (e.g., all) WTRUs/UAVs may have the capability to use a carrier $C_0$ and a carrier $C_1$. A $UAV_5$ may have the capability to use the $C_0$ (e.g., only $C_0$). From a regulation perspective, a regulator (e.g., such as the Federal Aviation Administration (FAA)) may mandate (e.g., similar to a manned aviation) that one or more (e.g., all) WTRUs/UAVs/drones to support a carrier, such as the $C_0$. The situational awareness and/or PIBS information may be broadcasted and/or may have one or more (e.g., all) other capabilities be optional. The resolutions on collision avoidance may be performed in the $C_1$ as an example, for the WTRUs/vehicles that support it.

As shown in FIG. 10, one or more (e.g., all) WTRUs/UAVs may exchange PIBS information in a carrier $C_0$. During the course of PIBS exchange, a $UAV_1$ may sense (e.g., first sense) a possibility of collision with one or more (e.g., all) WTRUs/UAVs or a subset of the rest of the WTRUs/UAVs (e.g., $UAV_2$, $UAV_3$, $UAV_4$, and/or $UAV_5$). The $UAV_1$ may transmit a signal (e.g., RA-Flag=1) as a part of PIBS. The signal transmitted by the $UAV_1$ may be sensed by others WTRUs/UAVS. As a $UAV_2$, a $UAV_3$, and/or a $UAV_4$ support a carrier $C_1$, the $UAV_2$, the $UAV_3$, and/or the $UAV_4$ may tune to the carrier $C_0$ to participate in a RA phase. As the $UAV_5$ does not support $C_1$, one or more of the followings may occur for the $UAV_5$. The $UAV_5$ may request other WTRUs/UAVs in a geographical vicinity to forward one or more (e.g., all) RA messages that other WTRUs/UAVs receive in the carrier $C_1$ to the carrier $C_0$ (e.g., the carrier that the $UAV_5$ supports). The $UAV_5$ may request other WTRUs/UAVs in the geographical vicinity to forward one or more (e.g., all) RA messages that includes the $UAV_5$ in the RA-list (e.g., that are received in the carrier $C_1$) to the carrier $C_0$.

Requesting other WTRUs/UAVs in the geographical vicinity to forward one or more (e.g., all) RA messages that includes the $UAV_5$ in the RA-list may include a request forwarding for a specific message(s) that the $UAV_5$ (e.g., the source WTRU/UAV) may be interested in. The request for forwarding the specific message that the source WTRU/UAV is interested in may be done at the application layer.

In examples, PIBS, such as ADS-B, may be supported in two or more frequencies (e.g., $C_0$, $C_1$). A WTRU/UAV may support one frequency (e.g., $C_0$ or $C_1$). For example, the WTRUs/UAVs/drones (e.g., similar to aircrafts in a manned aviation system) may operate in one or more (e.g., multiple) continents with differing regulations. The source WTRU, such as the $UAV_5$, may send out a PIBS forwarding message (e.g., a broadcast message) requesting the WTRUs/UAVs in the vicinity of the source WTRU, such as the $UAV_5$, to forward messages in the carrier $C_1$ to the carrier $C_0$.

Application layer forwarding may implement a PIBS forward message.

Figure 11:
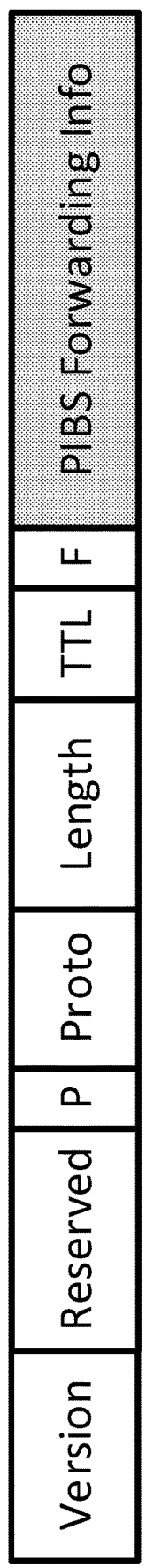
FIG. 11 illustrates an example of PIBS forwarding ($PIBS_F$) packet structure.

FIG. 11 illustrates an example PIBS forwarding ($PIBS_F$) packet structure. As shown in FIG. 11, the field P may refer to a mission priority. The field P (e.g., mission priority) may be configured by the UAS service supplier (USS) on a WTRU/UAV as a part of a mission approval procedure, e.g., prior to a commencement of the mission. The header from the exemplary $PIBS_F$ packet structure may include a version, a protocol discriminator (Proto), the length of the PIBS payload (Length), reserved fields, and/or priority field. The Proto field may hold a value indicating that the message is PIBS. PIBS Forwarding Info field may include one or more of the following. The PIBS Forwarding Info field may include a source ID. The PIBS Forwarding Info field may include a message IDs/parameters.

Source ID may include a source ID of a WTRU/UAV requesting forwarding. For example, if a $UAV_5$ requests forwarding, PIBS Forwarding Info field may include the source ID of the $UAV_5$.

Message IDs and/or parameters may include an application specific message IDs, details, and/or parameters that a source WTRU/UAV is requesting to be forwarded. For example, the Message ID=RA may denote a resolution advisory messages to be forwarded. If Message IDs and/or parameters field is blank, one or more (e.g., all) messages of the application may be forwarded.

L2/L3 forwarding may implement a PIBS forward message(s).

L2/L3 forwarding may include one or more of the followings. L2/L3 forwarding may include a source supported carrier(s). L2/L3 forwarding may include message specific carrier information. L2/L3 forwarding may include a logical channel ID(s). L2/L3 forwarding may include forwarding carrier information.

A source supported carrier(s) may include a carrier(s) supporting by a source WTRU/UAV (e.g., a WTRU/UAV that requests forwarding).

Message specific carrier information may include a carrier(s) in which the requested messages may be found.

Logical channel ID may denote a logical channel ID where the requested information to be forwarded may be found.

Forwarding carrier information may include a carrier(s) (e.g., preferred by the source WTRU/UAV) in which the forwarding messages are to be transmitted by other WTRUs/UAVs to the source WTRU/UAV.

Figure 12:
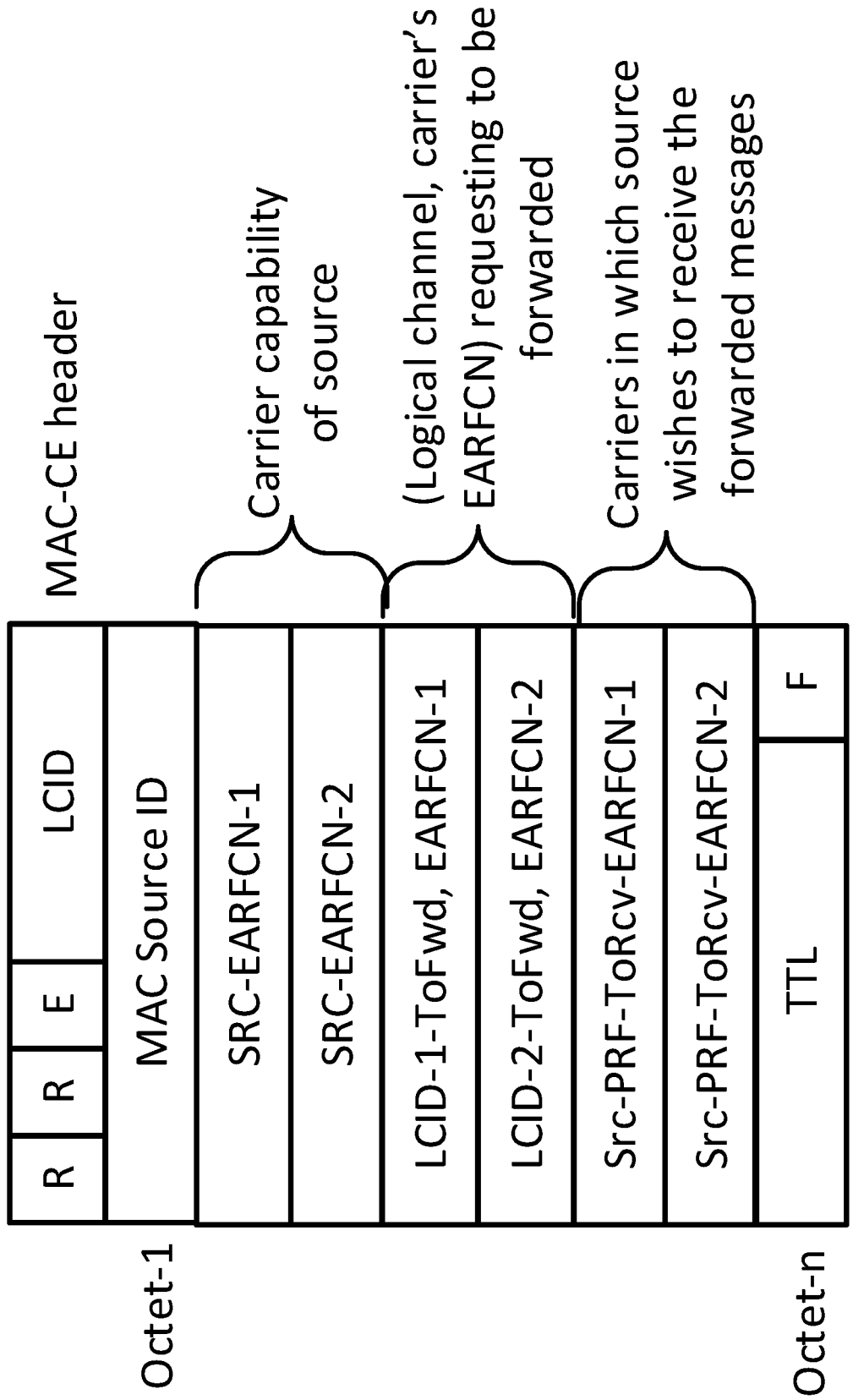
FIG. 12 illustrates an example forward request MAC-CE structure for sidelink.

A MAC control element (MAC-CE) denoting a forwarding request may be transmitted as a part of MAC PDU. The MAC-CE of type forward request may be broadcasted by a source WTRU/UAV. For example, the MAC-CE of type forward request may be broadcasted by a source WTRU/UAV in sidelink. FIG. 12 illustrates an example forward request MAC-CE structure for sidelink.

As shown in FIG. 12, LCID=0x0022 in the MAC-CE header may identify that the MAC CE is a forwarding request CE. A TTL flag may indicate time to live flag, and a F flag may denote a forward flag.

SRC-EARFCN (e.g., shown in FIG. 12) may denote the carrier(s) supported by the source.

(LCID-i-ToFwd, EARFCN-i) may denote the logical channel ID-i and the carrier information corresponding to this logical channel (e.g., denoted by EARFCN-i) requesting to be forwarded. For example, (2,3) may imply messages in the logical channel ID-2 belonging to carrier EARFCN-3 is requested to be forwarded by the source.

Src-PRF-ToRcv-EARFCN-i may indicate the carrier preference that a source wishes to receive the forwarded message corresponding to the requested combination (LCID-i-ToFwd, EARFCN-i). For example, the source may prefer messages in (LCID-i-ToFwd, EARFCN-i) to be forwarded in carrier Src-PRF-ToRcv-EARFCN-i.

ORIGINATING-ID/GROUP-ID field may be included (e.g., in addition to the fields shown in FIG. 12), and the field may indicate the originating source of the service/ID corresponding to a particular service.

Figure 13:
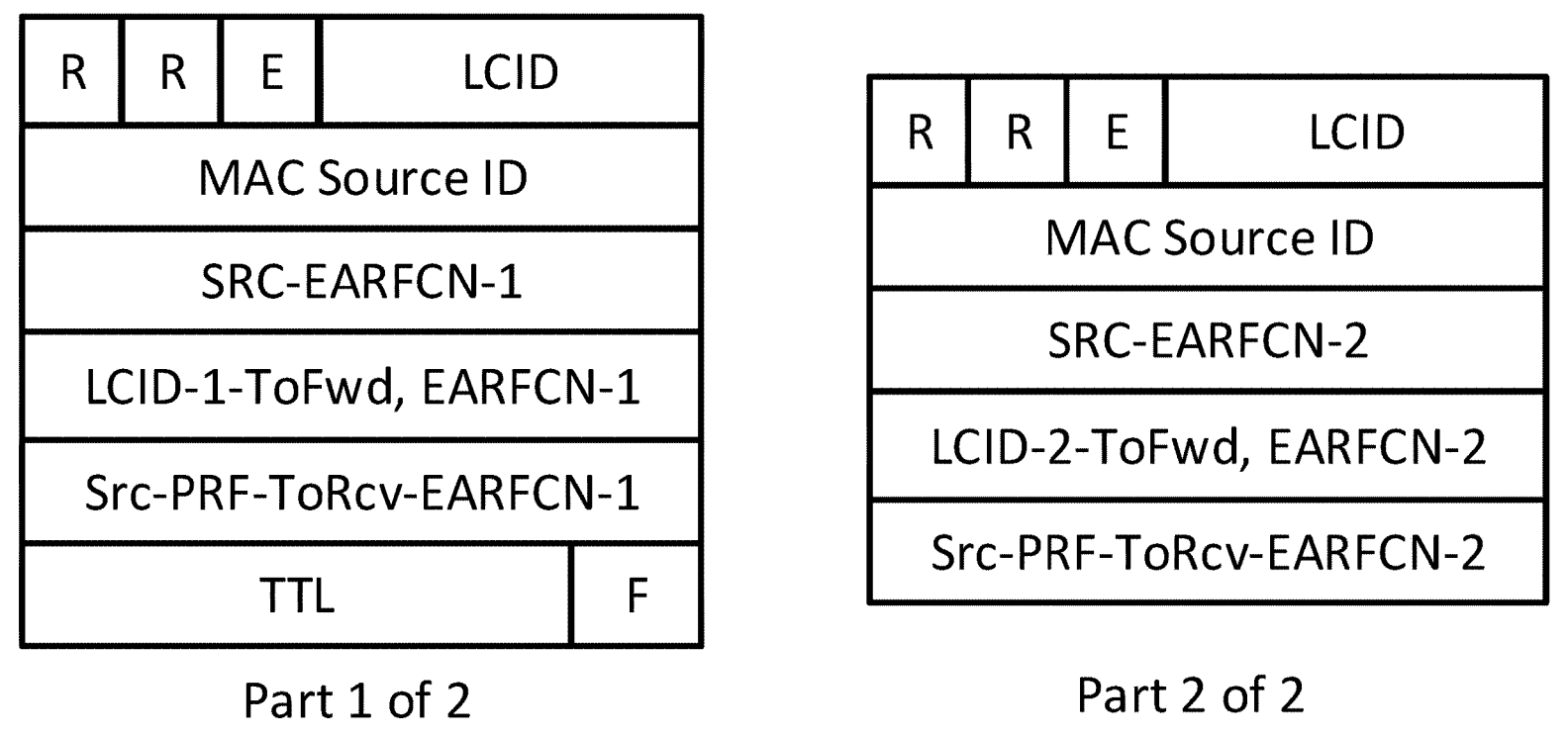

The MAC-CE in FIG. 12 may be sent as one or more (e.g., multiple) CEs if the original MAC-CE contents are large, e.g., as shown in FIG. 13. FIG. 13 illustrates an example MAC-CE of FIG. 12 sent as one or more (e.g., two) MAC-CEs.

Forwarding request described herein may be provided from a granularity of logical channel ID and/or a logical channel group. As many QoS class identifiers (QCIs) may map into the same logical channel ID, a LCID based forwarding request may result in more data being forwarded than the source is interested in. New QCIs may be defined for emergency collision avoidance purposes for WTRUs/UAVs/vehicles. The new QCIs may map to newly created (e.g., unique newly created) logical channel IDs/logical channel groups. For example, a one-to-one map between the newly created QCIs and the logical channel IDs may exist. If the new QCIs (e.g., having one-to-one map between the newly created QCIs and the logical channel IDs) exist, the WTRUs/UAVs may request specific messages as described herein.

A RRC level message (e.g., a RRC forwarding request) may be broadcasted in the sidelink. The RRC level message (e.g., a RRC forwarding request) may have one or more (e.g., all) the information fields described herein (e.g., FIGS. 11, 12, and/or 13).

If a WTRU/UAV receives a forwarding request and if the WTRU/UAV does not have a requested message, the WTRU/UAV may re-broadcast the requested message to the neighbors of the WTRU/UAV. For example, the WTRU/UAV may re-broadcast the requested message to the neighbors of the WTRU/UAV after decrementing the TTL field by 1 and setting the forward flag=1. The TTL field may control the number of hops that a WTRU/UAV is allowed to forward. The forward flag may make the downstream WTRUs/UAVs be aware of whether the received message is forwarded or not.

Relay information signaling for carrier capability may be provided for one or more constrained UAVs/WTRUs.

A source WTRU/UAV may provide information on a logical channel ID and/or carrier information in which a service is intended to be provided. For example, the source WTRU/UAV may provide information on the logical channel ID and/or carrier information in which a service is intended to be provided via MAC-CE/RRC signaling. The source WTRU/UAV may assign a logical channel ID (e.g., an unique logical channel ID) to transmit the service. The source WTRU/UAV may not share the assigned logical channel ID with another service. The carrier capability constrained WTRUs/UAVs may request the logical channel ID and/or the carrier to be forwarded to the WTRU/UAV, e.g., to obtain the desired service. In examples, the service in a particular logical channel of a carrier $C_1$ provided by a source $UAV_1$ may be assigned (e.g., by the $UAV_1$ and/or other entity) to be forwarded by another WTRU/UAV (e.g., $UAV_2$) in a carrier $C_0$. The service described herein may be provided in a preconfigured carrier that is globally known to one or more (e.g., all) WTRUs/UAVs. The logical channel ID that the source intends to transmit the service may be decided (e.g., decided dynamically) by the source WTRU/UAV and/or may be signaled (e.g., see FIG. 10).

For example, as shown in FIG. 10, a cluster head (e.g., $UAV_1$) may transmit the RA. A $UAV_5$ may not support a carrier $C_1$ and may not receive RA messages. The $UAV_5$ may transmit a forwarding request to its neighbors to forward RA messages transmitted by the cluster head, such as the $UAV_1$. When making a forwarding request, the $UAV_5$ may not be aware of the logical channel ID in which RA messages are broadcasted by the $UAV_1$. The $UAV_5$ may request to forward one or more (e.g., all) messages on the carrier $C_1$, which may provide redundant information and/or services to the $UAV_5$. The $UAV_1$ may provide the logical channel ID and/or carrier information of the RA service of the $C_1$, in a carrier $C_0$, e.g., via MAC-CE/RRC. The $UAV_5$ may provide an appropriate forwarding request. For example, the $UAV_5$ may provide an appropriate forwarding request indicating the logical channel ID to be forwarded.

Multi-carrier may perform relay forwarding.

Figure 14:
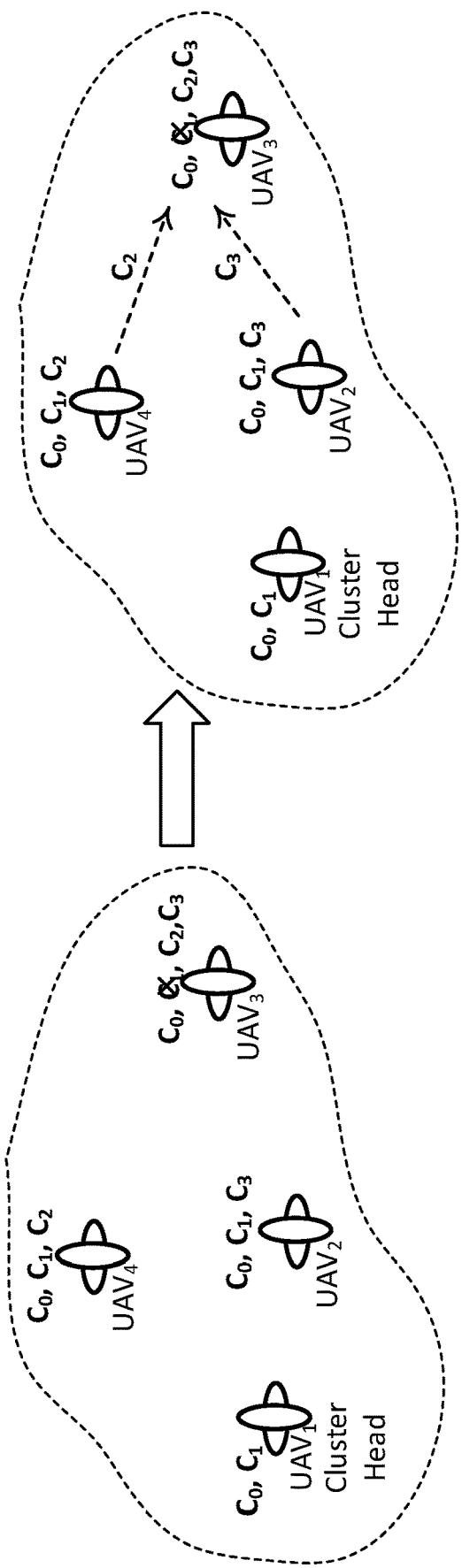
FIG. 14 an example multi-carrier relaying operation.

If one or more (e.g., multiple) carriers exists, a WTRU/UAV may be in coverage of some carrier(s) and may be out-of-coverage of other carrier(s). FIG. 14 illustrates an example multi-carrier relaying operation. As shown in FIG. 14, four WTRUs/UAVs (e.g., $UAV_1$, $UAV_2$, $UAV_3$, and/or $UAV_4$) may have different capabilities.

The WTRUs/UAVs depicted in FIG. 14 may transmit PIBS in a carrier $C_0$ and/or may perform RA coordination in a carrier $C_1$. The WTRUs/UAVs in FIG. 14 may enter a RA phase with a $UAV_1$ (e.g., $UAV_1$ being a cluster head). One or more WTRUs/UAVs may be in the radio range of each other with respect to their corresponding (e.g., individual) supported carriers. A $UAV_3$ may not be in the radio range of the cluster head with respect to the carrier $C_1$. For example, although the $UAV_3$ is in the radio range of the UAV with respect to the carrier $C_0$ (e.g., where the PIBS are transmitted), the $UAV_3$ may be out of the transmission range of the $UAV_1$ with respect to the carrier $C_1$, where the RA information is transmitted. One or more of the followings may occur. The $UAV_3$ may send out a forwarding request message(s). A $UAV_2$ may respond to the forwarding request message. A $UAV_4$ may respond to the forwarding request message. The $UAV_3$ may choose the $UAV_2$ and/or the $UAV_4$ as a relay.

The $UAV_3$ may send out one or more of the following forwarding request messages. The $UAV_3$ may send out $PIBS_F$ including an application level message(s) to be forwarded. The $UAV_3$ may send out a L2/L3 forwarding request(s). For example, the L2/L3 forwarding request(s) may be similar to a forwarding request MAC-CE structure for sidelink (e.g., as illustrated in FIG. 13), and the L2/L3 forwarding request(s) may be requested to forward a logical channel ID.

The $UAV_3$ may send out $PIBS_F$ including an application level message(s) to be forwarded. The $PIBS_F$ including the application level message(s) to be forwarded may include with one or more of the following fields. The $PIBS_F$ may include a source ID field. For example, the source ID may be $UAV_3$. The $PIBS_F$ may include a source supported carrier field. For example, the source supported carriers may be $C_0$, $C_1$, $C_2$, $C_3$. The $PIBS_F$ may include a message ID/parameter field. For example, the message IDs/parameters may be RA. The $PIBS_F$ may include a message specific carrier information field. For example, the message specific carrier information may be $C_1$. The $PIBS_F$ may include a forwarding carrier information field. For example, the forwarding carrier information may be $C_2$, $C_3$. The forwarding carrier information may indicate information about which carriers the $UAV_3$ prefers to receive the forwarded messages.

The $UAV_3$ may send out a L2/L3 forwarding request(s). The L2/L3 forwarding request(s) may be similar to a forwarding request MAC-CE structure for sidelink (e.g., as illustrated in FIG. 13 described herein). The L2/L3 forwarding request(s) may include a logical channel ID that is requested to be forwarded.

The $UAV_2$ may respond to the forwarding request message (e.g., sent by the $UAV_3$). The $UAV_2$ response may indicate that the $UAV_2$ may forward the information that the $UAV_2$ receives in the $C_1$, e.g., using the $C_3$. The $UAV_2$ may forward the information received in the carrier $C_1$ (e.g., from the cluster head) to the $UAV_3$, e.g., in the carrier $C_1$. For example, the $UAV_2$ may forward the information received in the carrier $C_1$ to the $UAV_3$ in the carrier $C_1$ because the $UAV_3$ is in a radio range of the $UAV_2$ with respect to the carrier $C_1$. Forwarding the information received in in the carrier $C_1$ to the $UAV_3$ may not be an option because of the preference indicated in the information element from the forwarding carrier information (e.g., indicating that the $UAV_3$ prefers to receive the forwarded messages via the $C_2$, $C_3$).

The $UAV_4$ may respond to the forwarding request message. The $UAV_4$ response may indicate that the $UAV_4$ may forward the information that the $UAV_4$ receives in the $C_1$, e.g., using the $C_2$. The $UAV_4$ may forward the information received in the carrier $C_1$ (e.g., from the cluster head) to the $UAV_3$ in the carrier $C_1$. For example, the $UAV_4$ may forward the information received in the carrier $C_1$ to the $UAV_3$ in the carrier $C_1$ because the $UAV_3$ is in a radio range of the $UAV_4$ with respect to the carrier $C_1$. Forwarding the information received in the carrier $C_1$ to the $UAV_3$ may not be an option because of the preference indicated in the information element from the forwarding carrier information (e.g., indicating that the $UAV_3$ prefers to receive the forwarded messages via $C_2$, $C_3$).

The $UAV_3$ may do one or more of the followings. In examples, the $UAV_3$ may choose the $UAV_2$ as a relay. In examples, the $UAV_3$ may choose the $UAV_4$ as a relay. In examples, the $UAV_3$ may choose the $UAV_2$ and the $UAV_4$ as relays to receive the forwarding information in the carriers $C_3$, $C_2$ respectively.

The $UAV_3$ may choose the $UAV_2$ as a relay. For example, the $UAV_3$ may choose the $UAV_2$ as a relay to receive the forwarding information in the carrier $C_3$.

The $UAV_3$ may choose the $UAV_4$ as a relay. The $UAV_3$ may choose the $UAV_3$ as a relay to receive the forwarding information in the carrier $C_2$.

The $UAV_3$ may choose the $UAV_2$ and the $UAV_4$ as relays to receive the forwarding information in the carriers $C_3$, $C_2$, respectively. The $UAV_3$ may obtain identical forwarding information from two sources (e.g., the $UAV_2$ and the $UAV_4$). The number of transmissions in the carriers $C_3$, $C_2$ may be adapted as described herein.

A source WTRU/UAV may transmit a service/carrier forwarding request via sidelink broadcast using one or more of the followings: a $PIBS_F$ application layer message indicating a message ID to be forwarded; and/or a MAC-CE of type forwarding request indicating a tuple.

A $PIBS_F$ application layer message may indicate a message ID to be forwarded. The carrier(s) in which the messages indicated by the message ID may be obtained. The preferred carriers that the WTRU/UAV wishes to receive the forwarded message may be indicated, as described herein.

A MAC-CE of type forwarding request may indicate a tuple. For example, the tuple may include (logical channel ID, carrier) to be forwarded along with the preferred carriers in which the WTRU/UAV wishes to receive the forwarded message as described herein.

A $UAV_2$ may receive the forwarding request from a $UAV_1$. The $UAV_2$ may realize that the $UAV_2$ does not support the forwarding request. The $UAV_2$ may modify the content of the TTL field. The $UAV_2$ may re-broadcast the forwarding request message. For example, the $UAV_2$ may re-broadcast the forwarding request message based on the value of the TTL field meeting one or more pre-configured thresholds/conditions.

A source WTRU/UAV may transmit a forwarding request in sidelink. The source WTRU/UAV may realize that one or more (e.g., multiple) WTRUs/UAVs with appropriate carrier capabilities may support the request. The source WTRU/UAV may receive service-1 from the first WTRU/UAV using a carrier $C_1$. The source WTRU/UAV may receive service-2 from the second WTRU/UAV using a carrier $C_2$ (e.g., concurrently).

A WTRU may be configured to perform contention resolution for sidelink resources.

Figure 15:
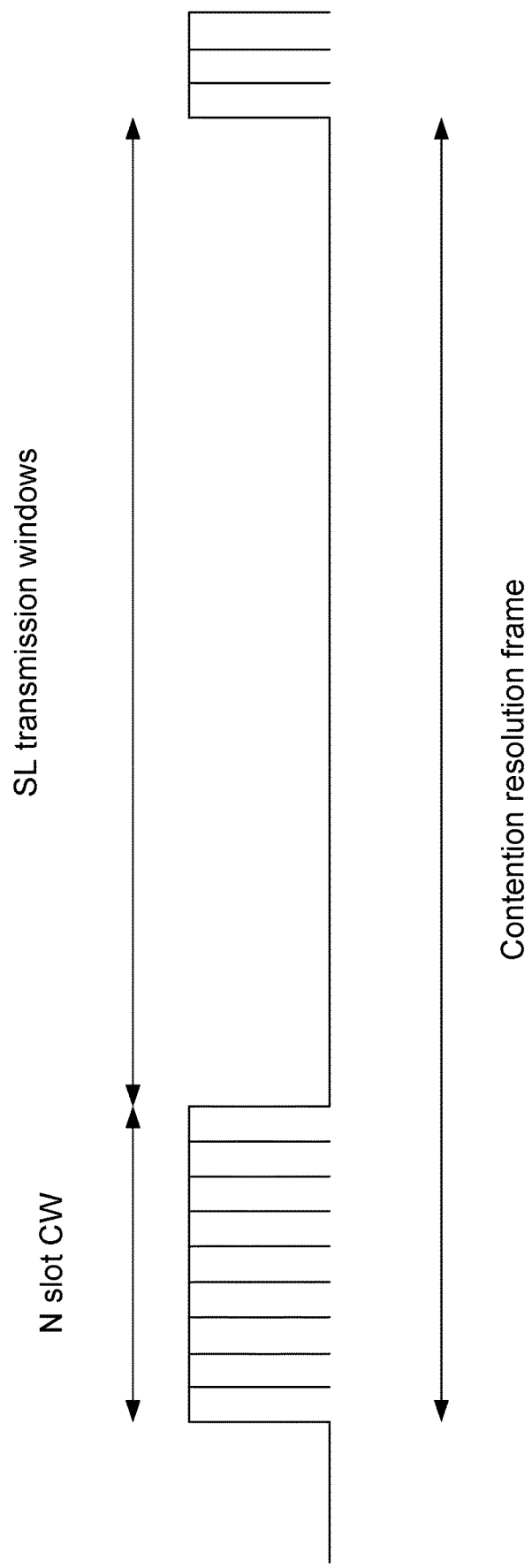
FIG. 15 illustrates an example content resolution frame and contention resolution slot.

FIG. 15 illustrates an example content resolution frame and contention resolution slot. As shown in FIG. 15, sidelink (SL) mobiles may maintain a common time base, e.g., relative to the downlink of the eNB. The mobiles may be configured with a contention resolution frame of duration M. For example, the duration M may starts when (SFN mod M==0). At the start of a contention resolution frame, the mobile may employ a contention resolution window of N niches. During the contention resolution window of N niches, the mobiles may attempt to determine a better/more suitable transmission resource (e.g., the best/most suitable transmission resource) to use at the expiry of the N slot contention resolution window. A niche within the contention resolution window may be of a duration much smaller than one transmission time interval (TTI). For example, if a TTI is 1 ms long, the niche duration may be 50 μs or 100 μs. The niche duration may be configurable by a network, such as an eNB or a gNB. If the niche duration is not configured, a default niche duration may be configured the mobiles to equal 50 μs.

The contention resolution frame of duration M may be periodic, and the value of M may be static. For example, the value of M may be static until the value is updated by the network to a different value. For example, the value of M may be updated by the network based on the eNB internal algorithms. If the contention resolution frame size M needs to be modified, the eNB may signal the sidelink mobile. For example, the eNB may signal the sidelink mobile via a BCCH modification message. The BCCH modification message may indicate that the contention frame size M may be modified at the modification boundary. The size of contention window N may change a contention frame. For example, the size of the contention window N may change a contention frame based on a function of SFN, a choice of SL channel, a configured (e.g., explicitly configured) or preconfigured pattern, and/or the like. The mobiles that transmit at the end of contention window N may participate in a contention resolution phase lasting utmost N niches. During the contention resolution phase lasting utmost N niches, the mobiles may decide on the resources and/or channels to use.

The N niche contention window may runs from [0, 1, . . . , N−1]. Mobiles may transmit at the end of N niche contention window. In each niche, if the mobiles need to transmit at the end of N niche contention window, the mobiles may attempt to determine a better/suitable (e.g., the best/most suitable) resource and/or channel to use. K mobiles may be configured for SL. L of the SL mobiles (e.g., L≤K) may need transmission in the current contention frame. One or more of the following may be applied by the mobiles.

Figure 16:
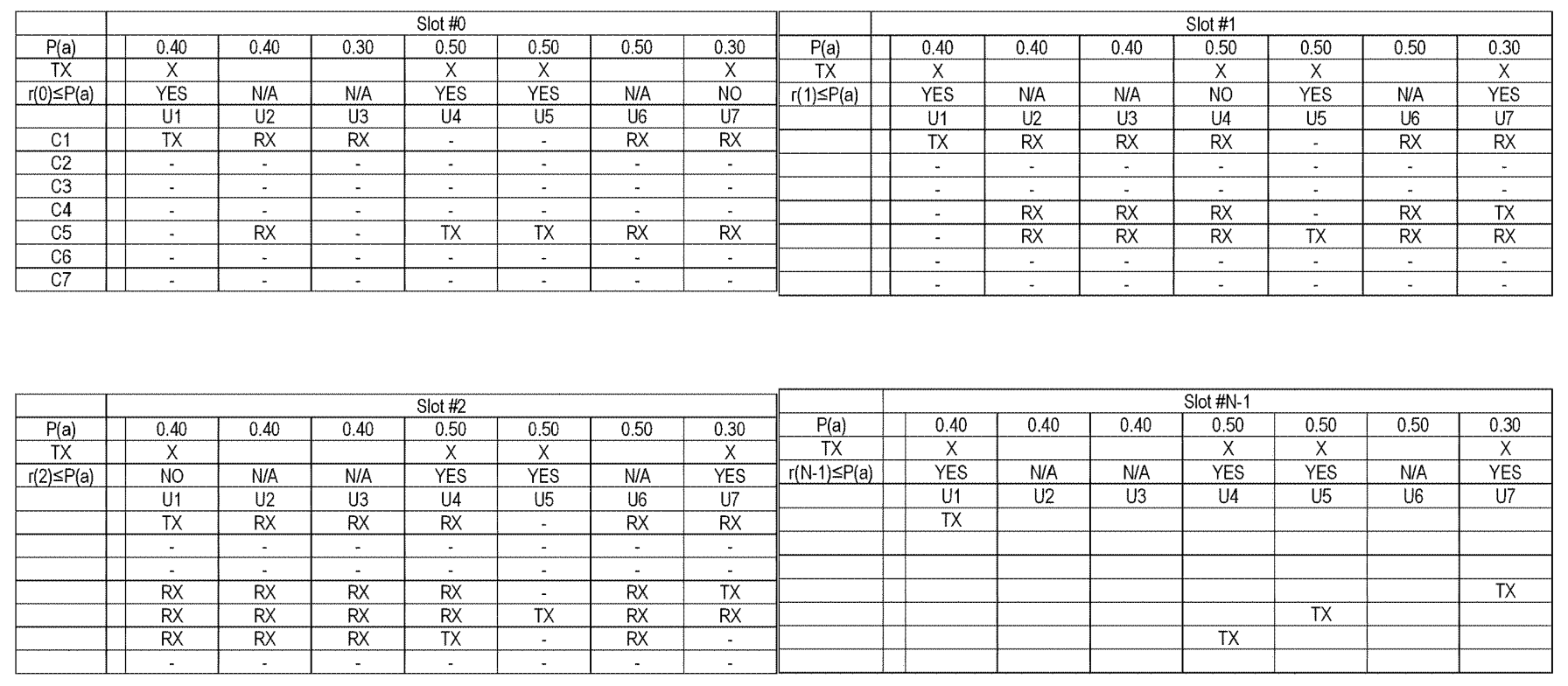

The network may configure a probability of access, P(a)=[0,1], to each mobile that has registered to use Side-Link. P(a) may be different for one or more (e.g., various) mobiles and/or may be based on mobile priority, service priority, and/or the like. P(a) may be configured at the mobile via a RRC procedure. For example, P(a) may be configured at the mobile via RRC CONNECTION SETUP or RRC CONNECTION RECONFIGURATION. If the currently used service by the SideLink mobile is about to change or modify, a P(a), such as a new P(a), may be configured at the mobile. The larger the value of P(a), the higher probability of access may be for the mobile. For example, FIG. 16 illustrates contention resolution at MAC layer as described herein.

The mobiles may maintain a list of resources and/or channels configured for SideLink access. The list of resources and/or channels may be configured. For example, the list of resources and/or channels may be configured by the eNB, by an application, by a network server, and/or may be preconfigured at the mobiles. The list of R resources ($C_1$, $C_2$, $C_3$, . . . , $C_R$) and/or the associated status may be maintained by the SideLink mobiles. The resource status may include {occupied, available, reserved}. If the resource status is occupied (e.g., Status=occupied), a resource and/or a channel may be indicated to be in use by or has been reserved by some other mobile. If the resource status is available (e.g., Status=available), a resource and/or a channel may be indicated to be not-in-use by a mobile, including the mobile itself. If the resource status is reserved (e.g., Status=reserved) a resource and/or a channel may be indicated to be reserved by the mobile itself.

In a contention frame M (e.g., at the top of the contention frame M), the mobiles may initialize the status for the list of R resources, ($C_1$, $C_2$, . . . $C_R$) to be (available) and/or may update the Status for the resource and/or channel $C_j$, 1≤j≤R in a niche i, 0≤I≤N−1, of the contention window as described herein.

In a niche i, 0≤I≤N−1, the L mobiles that have a transmission may draw a random number r(i) and may be distributed (e.g., uniformly distributed) between [0:1]. The mobile may compare its randomly drawn number r(i) with the P(a) configured by the network.

If a random number is less than or equal to a probability of access (e.g., r(i)≤P(a)), the mobile may select (e.g., randomly select) a resource $C_j$, 1≤j≤R, whose status may be available (e.g., status=available) and/or may transmit a reservation signal, e.g., at a fixed power $P_{Beacon}$. The reservation signal may modulate and/or encode information. The reservation signal may be transmitted on a selected resource $C_1$, 1≤j≤R, e.g., chosen by the mobile. The mobile may mark the status of selected $C_j$ to reserved.

Two or mobile mobiles may choose the same resource $C_j$ to transmit a reservation signal. In an iterative procedure lasting N contention niches, the contention may be removed (e.g., removed iteratively) and/or resources may be selected (e.g., selected unambiguously). For example, the resources may be selected as a function of size of (L, N).

In a niche i, 0≤I≤N−1, the mobiles, that do not have a transmission and/or the mobiles that have a transmission but whose r(i)>P(a), may measure received signal strength indicator (RSSI) for a resource $C_j$, 1≤j≤R and/or may compare the RSSI ($C_j$) against a threshold $THR_{RSSI}$. $THR_{RSSI}$ may be configured by the eNB.

If the measured RSSI for a resource $C_1$ is less than or equal to the threshold RSSI (e.g., RSSI $(C_j) \leq THR_{RSSI}$), status of the resource $C_j$ may be marked available (e.g., status of $C_j$=available). If the measured RSSI for a resource $C_j$ is greater than the threshold RSSI (e.g., RSSI $(C_j) > THR_{RSSI}$), the status of the resource $C_j$ may be marked occupied (e.g., status of $C_j$=occupied).

One or more (e.g., all) mobiles that have measured RSSI, including the mobiles that have a transmission but may be unable to transmit due to r(i)>P(a), the resource/may update channel availability list in niche i.

If a mobile that has a transmission had previously selected $C_j$ and transmitted a reservation signal in a niche b (e.g., b≠i and b<i), subsequently notes that RSSI $(C_j)$ is greater than the threshold RSSI (e.g., RSSI $(C_j) > THR_{RSSI}$) in niche i, the mobile may update the status of the resource $C_j$ as occupied (status of $C_j$=occupied). On a next opportunity, the mobile may discount this resource $C_j$ and/or may select a different resource from the list whose status=available. In example, if a mobile that has a transmission had previously selected the $C_j$ and transmitted a reservation signal in a niche b (e.g., b≠i and b<i), subsequently notes that RSSI $(C_j)$ is less than or equal to the threshold RSSI (e.g., RSSI $(C_j)$ $THR_{RSSI}$) in niche i, the mobile may maintain the status to be reserved (e.g., status=reserved) and/or may keep the reservation valid for next transmission.

The mobiles that transmit a reservation signal on niche i may not measure RSSI for a resource $C_j$, 1≤j≤R.

The niche index i may be increased (e.g., increased by 1). The process described herein may be repeated. For example, the process described herein may be repeated so long as i≤N−1.

If i>N−1, the L mobiles that have transmission opportunity may transmit on the respective resource and/or channel $C_j$ for which it has status=reserved.

FIG. 16 illustrates the process described herein. For example, seven mobiles (e.g., U1 to U7) and seven channels (e.g., C1 to C7) over N−1 niches may be implemented. The assigned probability of access P(a) and the random number r(i) for niche i may be shown. The mobile that has a transmission may be marked with a X. The transmitted channel may be marked with TX. An available channel (e.g., if RSSI<THR) may be marked with a dash. The occupied channel (e.g., if RSSI>THR) may be marked with RX.

Figure 17:
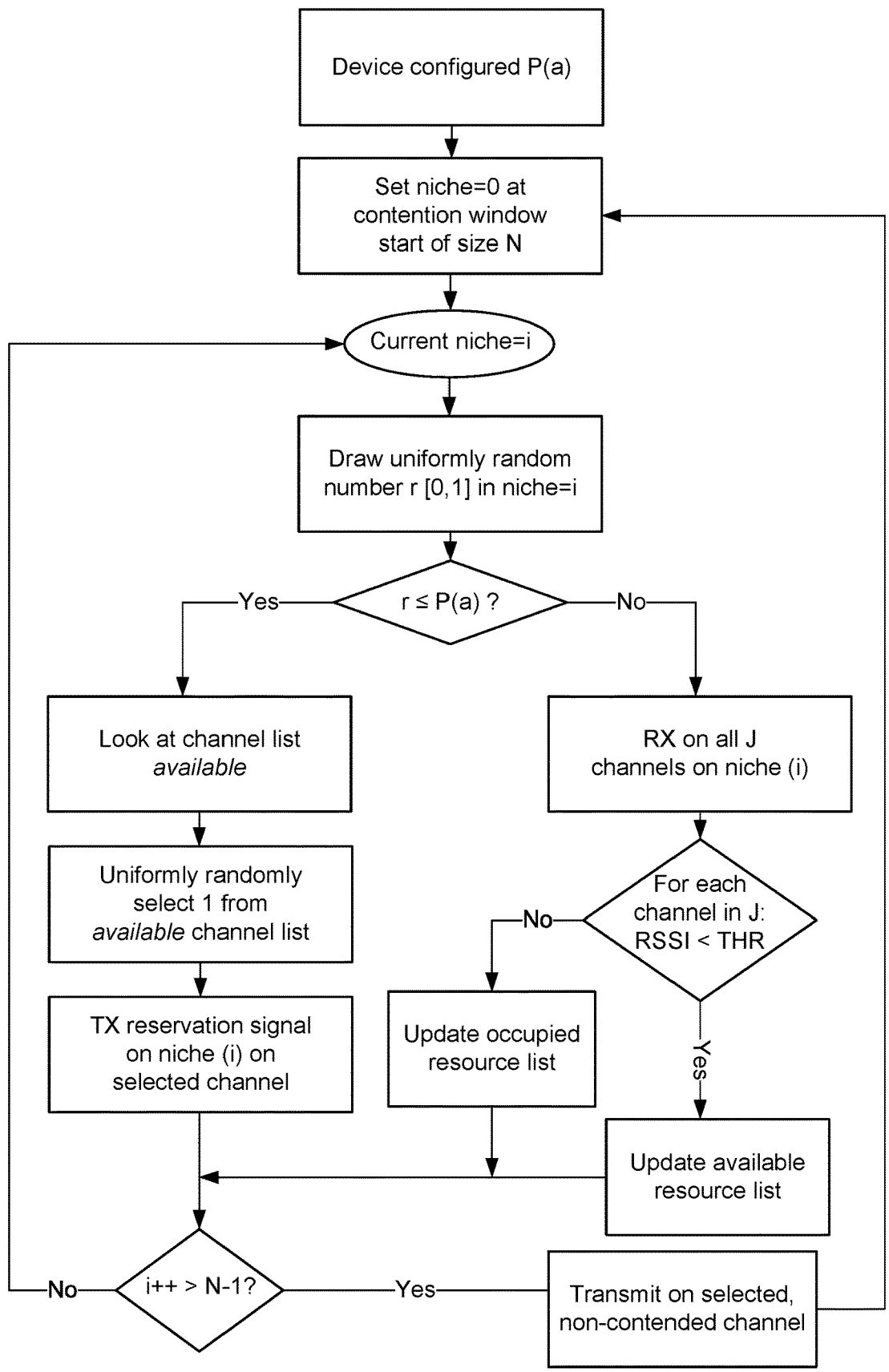
FIG. 17 illustrates an example flowchart of resource reservation and contention resolution.

FIG. 17 illustrates an example flowchart of resource reservation and contention resolution. For example, a WTRU that wants to transmit on sidelink, e.g., on receiving the duration of contention resolution frame N, contention resolution window M, and/or the probability of access P(a) may perform one or more of the followings in niche i.

The WTRU may draw (e.g., randomly draw) a number, r, in [0:1]. If the randomly drawn number r is less than or equal to the probability of access P(a) (e.g., r P(a)), the WTRU may choose (e.g., randomly choose) a resource $C_j$, 1≤j≤R, for which the status=available and/or the WTRU may transmit a reservation signal in the chosen resource, e.g., at a fixed power $P_{Beacon}$.

If at the niche k, where the niche k is less than the niche i (e.g., k<i), the WTRU may transmit a reservation signal in resource $C_m$. If the current status (e.g., at the niche i) for resource $C_m$ is available, the WTRU may transmit the reservation signal in resource $C_m$ with power $P_{Beacon}$.

If the randomly drawn number r is greater than the probability of access P(a) (e.g., r(i)>P(a)), the WTRU may listen to one or more (e.g., all) resources $C_j$, 1≤j≤R and/or may update its knowledge of the available resources using one or more of the following criterion: update status of $C_j$ as available if RSSI $(C_j) \leq THR_{RSSI}$; and/or update status of $C_j$ as occupied if RSSI $(C_1) > THR_{RSSI}$.

The WTRU that does not want to transmit on sidelink may update the status of one or more (e.g., all) resources $C_j$, 1≤j≤R, using one or more of the following criterion: update status of $C_j$ as available if RSSI $(C_1)$ $THR_{RSSI}$; and/or update status of $C_j$ as occupied if RSSI $(C_1) > THR_{RSSI}$.

At the end of niche: (N−1), the WTRU may realize that the resource is reserved and/or may start to transmit data beginning of niche N through M.

A WTRU may be configured to use UAV/WTRU-Context specific offsets, for example to support carrier selection.

Carrier selection may be provided based on a context and/or a scenario experienced by a WTRU/UAV. For example, a network, such as an eNB, may make one or more different carriers favorable to the WTRU/UAV, e.g., depending on a level of congestion experienced by the WTRU/UAV. In examples, if $a_1 < CBR \leq b_1$, a carrier $C_1$ may be made more favorable. In examples, if $a_2 < CBR \leq b_2$, a carrier $C_4$ may be made more favorable.

The carrier that the WTRU/UAV sees favorable may be based on the context, such as CBR levels. The eNB may perform a load balancing (e.g., as described herein) as a preemptive mechanism. For example, the eNb may perform the load balancing to avoid congestion by making one or more (e.g., multiple) carriers favorable and may distribute the load.

The context that was described herein with respect to the CBR may be an example. One or more other contexts may be defined and/or used.

Figure 18:
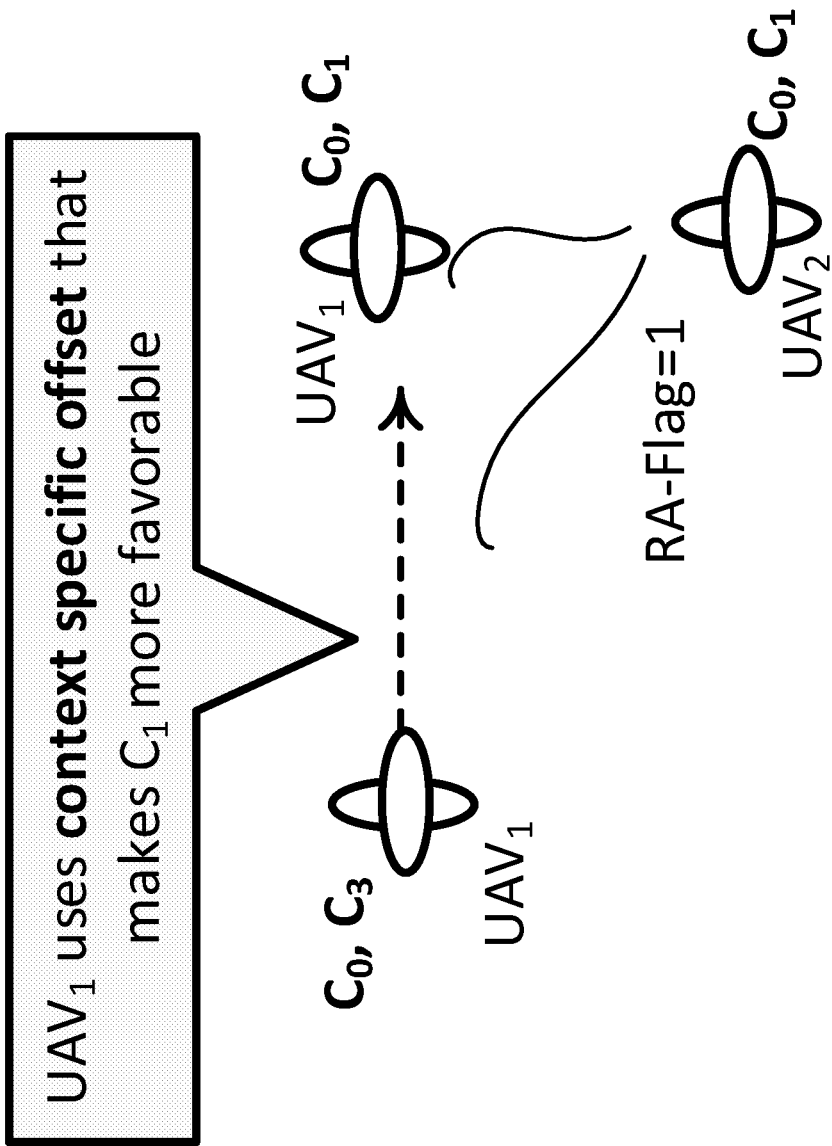
FIG. 18 illustrates an example context specific WTRU/UAV for resolution advisory.

FIG. 18 illustrates an example context specific WTRU/UAV for resolution advisory. As shown in FIG. 18, two WTRUs/drones (e.g., $UAV_1$ and $UAV_2$) may exist. PIBS may be transmitted in a carrier $C_0$ and RA specific services in a carrier $C_1$. The $UAV_1$ and the $UAV_2$ may be tuned to the $C_0$ for the PIBS as mandated. The UAV may tuned to a carrier (e.g., a secondary carrier), such as a $C_3$, performing other operations (e.g., taking a photography). The $UAV_2$ may sense (e.g., first sense) the potential for collision with the $UAV_1$. The $UAV_2$ may tune its carrier (e.g., the secondary carrier such as $C_3$) to the $C_1$ and may send out a signal (e.g., RA_Flag=1) as a part of its PIBS message. The signal (e.g., RA_Flag=1) may be subsequently received by the $UAV_1$. When the UAV receives this message, the $UAV_1$ may apply the context specific offset. The context may be the reception of the RA_Flag=1 and may make the carrier $C_1$ more favorable than the carrier $C_3$. As depicted in FIG. 18, the $UAV_1$ may perform carrier selection to the $C_1$ (e.g., from the $C_3$) to participate in resolution advisory with the $UAV_2$.

A UAV/WTRU may be divided in one or more classes, and one or more offsets may be provided based on a WTRU/UAV-class(es).

A UAV/WTRU may have an uplink (Uu) in a carrier $f_1$. The serving frequency and the serving carrier may be used interchangeably. The carrier $f_1$ may not support side-link (SL). The WTRU may desire to perform SL communications. The serving frequency (e.g., $f_1$) may provide information on one or more non-serving frequencies that support SL. Based on this information, the UAV/WTRU may decide to perform side-link in another carrier, such as a carrier with a non-serving frequency, such as $f_4$, as the carrier with $f_1$ serving frequency does not support SL. Table 3 provides an example for carrier supporting UU and/or SL. For example, as shown in Table 3, a carrier with a $f_1$ serving frequency may support Uu but not SL. A carrier with a $f_4$ non-serving frequency may support Uu and SL.

TABLE 3

Example of carriers supporting Uu and/or SL

| Interface | Freq | |
|---|---|---|
| | $f_1$ | $f_4$ |
| Uu | ✓ | ✓ |
| SL | X | ✓ |

A WTRU may transmit (e.g., actively transmit) in Uu and/or SL. For example, a drone (e.g., UAV/WTRU) may perform command and control (C2) on the Uu interface, while performing supplemental functions, such as detect and avoid (DAA) with other WTRUs/UAVs in the vicinity through SL. In this situation, the WTRU/drone may end up switching back and forth between $f_1$ and $f_4$ to perform C2 and DAA, respectively. The carrier with frequency $f_4$ may support Uu and SL. The WTRU may switch between $f_1$ and $f_4$. For example, the switching between the two frequencies may occur because of a cell reselection process is configured and/or performed independently for Uu and SL. That is, as the WTRU selects a non-serving frequency (e.g., $f_4$) for the SL, the WTRU may perform a cell reselection process to select a better cell for SL operations. The WTRU may perform a Uu cell selection process, which may have an impact in the battery life of the WTRU. The WTRU may perform the cell reselection process for SL operation and may perform the Uu cell selection process simultaneously. The Uu and SL may be coaxed to the same frequency for (e.g., only for) a particular class of WTRUs (e.g., drone class and/or public safety WTRUs).

The Uu serving eNB may provide reselection offset for the SL frequency. The reselection offset for the SL frequency may make the SL carrier more favorable for Uu than the current serving Uu. The Uu serving eNB may provide reselection offset for the SL frequency through a system information message. As shown in Table 3, a positive offset may be provided for $f_4$ through SIB3 broadcasted by a serving cell in $f_1$. The offset may be applicable (e.g., applicable only) to specific classes of WTRUs (e.g., drones and/or public safety WTRUs). The WTRUs other than the specific class may not use this offset that makes the SL carrier (e.g., $f_4$) more favorable.

In examples, a WTRU/UAV may receive a context specific offset(s) through a system information message, RRC, and/or the like. The contexts may be predefined and/or sent through a higher layer signaling, for example during RRC connection setup. An ID (e.g., an unique ID) may denote one or more (e.g., every) contexts. The context specific offsets may be signaled with respect to the corresponding ID.

A WTRU/UAV may experience a particular context and may apply the context appropriate offset to select a carrier.

In example, a WTRU/UAV may receive a class specific offset(s) through a system information message, RRC, and/or the like. A UAV may realize that the $UAV_1$ does not belong to the class for which the class specific offset applies. The UAV may ignore the received class specific offset(s). A $UAV_2$ may realize that the $UAV_2$ does belong to the class for which the class specific offset applies and may use the realization to select an appropriate carrier.

Although the features and elements of the present invention are described in the preferred embodiments in particular combinations, each feature or element may be used alone without the other features and/or elements of the preferred embodiments or in various combinations with or without other features and elements described herein.

Although the features described herein may consider 3GPP specific protocols, it is understood that the features described herein may not be restricted to this scenario and may be applicable to other wireless systems as well.

Throughout the features and/or provided examples cover drones and aerial vehicles, the features and/or examples covered here may equally apply to all wireless terminals.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A first wireless transmit/receive unit (WTRU) comprising:
a processor configured to:
monitor a first sidelink resource associated with a first set of carriers to determine a first resource usage parameter for the first sidelink resource;
receive, from a second WTRU, a second resource usage parameter for a second sidelink resource, wherein the second sidelink resource is associated with a second set of carriers and the second sidelink resource is associated with the second WTRU, and wherein the first set of carriers is different from the second set of carriers;
perform a reference signal received power (RSRP) measurement based on one or more of the first sidelink resource and the second sidelink resource;
assign respective weights to the first sidelink resource and the second sidelink resource based on the RSRP measurement;
generate an aggregated carrier usage report based on the respective weights respectively applied to the first resource usage parameter for the monitored first sidelink resource associated with the first set of carriers and to the second resource usage parameter for the second sidelink resource associated with the second set of carriers; and
transmit the generated aggregated carrier usage report.

2. The first WTRU of claim 1, wherein the processor is further configured to:
generate the first resource usage parameter for the first sidelink resource based on the monitored first sidelink resource, wherein the monitored first sidelink resource is connected to the first WTRU.

3. The first WTRU of claim 1, wherein the aggregated carrier usage report comprises one or more of channel busy ratio, channel occupancy ratio, or channel ratio associated with the first sidelink resource and the second sidelink resource.

4. The first WTRU of claim 1, wherein the processor is further configured to:
determine the respective weights, wherein the respective weights comprise one or more of RSRP information, staleness information, or frequency information associated with one or more of the first sidelink resource or the second sidelink resource.

5. The first WTRU of claim 1, wherein the processor is further configured to:
transmit the aggregated carrier usage report periodically.

6. The first WTRU of claim 1, wherein the processor is further configured to:
perform a sidelink carrier selection based on the aggregated carrier usage report.

7. The first WTRU of claim 1, wherein the processor is further configured to:
transmit the aggregated carrier usage report to at least one of the first set of carriers or the second set of carriers.

8. A method comprising:
monitoring a first wireless transmit/receive unit (WTRU) for a first sidelink resource associated with a first set of carriers to determine a first resource usage parameter for the first sidelink resource;
receiving, from a second WTRU, a second resource usage parameter for a second sidelink resource, wherein the second sidelink resource is associated with a second set of carriers, and the second sidelink resource is associated with the second WTRU, and wherein the first set of carriers is different from the second set of carriers;
performing a reference signal received power (RSRP) measurement based on one or more of the first sidelink resource and the second sidelink resource;
assigning respective weights to the first sidelink resource and the second sidelink resource based on the RSRP measurement;
generating an aggregated carrier usage report based on the respective weights respectively applied to the first resource usage parameter for the monitored first sidelink resource associated with the first set of carriers and to the second resource usage parameter for the second sidelink resource associated with the second set of carriers; and
transmitting the generated aggregated carrier usage report.

9. The method of claim 8, wherein the method further comprises:
generating the first resource usage parameter for the first sidelink resource based on the monitored first sidelink resource, wherein the monitored first sidelink resource is connected to the first WTRU.

10. The method of claim 8, wherein the aggregated carrier usage report comprises one or more of channel busy ratio, channel occupancy ratio, or channel ratio associated with the first sidelink resource and the second sidelink resource.

11. The method of claim 10, wherein the method further comprises:
determining the respective weights, the respective weights comprising one or more of RSRP information, staleness information, or frequency information associated with one or more of the first sidelink resource or the second sidelink resource.

12. The method of claim 8, wherein the method further comprises:
transmitting the aggregated carrier usage report periodically.

13. The method of claim 8, wherein the method further comprises:
performing a sidelink carrier selection based on the aggregated carrier usage report.

14. The method of claim 8, wherein the method further comprises:
transmitting the aggregated carrier usage report to at least one of the first set of carriers or the second set of carriers.

15. A non-transitory computer readable medium storing instructions which, when executed by one or more processors, cause the one or more processors to perform the method of claim 8.

* * * * *